US012638189B2

(12) United States Patent
Huang et al.

(10) Patent No.: US 12,638,189 B2
(45) Date of Patent: May 26, 2026

(54) GAS OVEN

(71) Applicant: GRAND MATE CO., LTD., Taichung City (TW)

(72) Inventors: Chin-Ying Huang, Taichung City (TW); Hsin-Ming Huang, Taichung City (TW); Hsing-Hsiung Huang, Taichung City (TW); Yen-Jen Yeh, Taichung City (TW)

(73) Assignee: GRAND MATE CO., LTD., Taichung City (TW)

( * ) Notice: Subject to any disclaimer, the term of this patent is extended or adjusted under 35 U.S.C. 154(b) by 448 days.

(21) Appl. No.: 18/206,004

(22) Filed: Jun. 5, 2023

(65) Prior Publication Data

US 2024/0401817 A1      Dec. 5, 2024

(51) Int. Cl.
| | |
|---|---|
| *F24C 15/00* | (2006.01) |
| *A21B 1/24* | (2006.01) |
| *F24C 3/08* | (2006.01) |
| *F24C 3/12* | (2006.01) |
| *F24C 15/02* | (2006.01) |

(Continued)

(52) U.S. Cl.
CPC ............ *F24C 15/322* (2013.01); *A21B 1/245* (2013.01); *F24C 3/087* (2013.01); *F24C 3/128* (2013.01); *F24C 15/006* (2013.01); *F24C 15/02* (2013.01); *F24C 15/2007* (2013.01)

(58) Field of Classification Search
CPC .................................................... F24C 15/006
See application file for complete search history.

(56) References Cited

U.S. PATENT DOCUMENTS

| | | | | | |
|---|---|---|---|---|---|
| 3,499,430 A | * | 3/1970 | Kemp | ..................... | F24C 14/02 126/21 R |
| 3,590,804 A | * | 7/1971 | Welshofer | ............. | F24C 14/025 126/41 R |

(Continued)

FOREIGN PATENT DOCUMENTS

| | | |
|---|---|---|
| CN | 2555634 Y | 6/2003 |
| CN | 110382956 A | 10/2019 |

OTHER PUBLICATIONS

Search Report for TW1112115492, Issued on Mar. 27, 2023, Total of 2 pages.

(Continued)

*Primary Examiner* — Jorge A Pereiro
(74) *Attorney, Agent, or Firm* — Apex Juris, pllc; Hilde M. L. Coeckx

(57) ABSTRACT

A gas oven includes a casing, an inner oven body, a blower, a branched member, a gas supply pipe, and a combustion device. The casing has a feed opening and the inner oven body is disposed in the casing. An airflow passage is located around at least a part of the periphery of the inner oven body between the inner oven body and the casing. The blower has a blower outlet communicating with an inlet of the airflow passage. The branched member includes a branched passage communicating with the blower outlet. The gas supply pipe has a gas outlet. The combustion device is disposed in the inner oven body and communicates with the branched outlet and the gas outlet. The amount of the combustion air can be increased and the temperature of the casing can be reduced.

17 Claims, 22 Drawing Sheets

(51) Int. Cl.
    *F24C 15/20*         (2006.01)
    *F24C 15/32*         (2006.01)

(56)              References Cited

U.S. PATENT DOCUMENTS

| | | | | |
|---|---|---|---|---|
| 3,596,651 A | * | 8/1971 | Welshofer | F24C 15/021 |
| | | | | 126/190 |
| 3,659,579 A | * | 5/1972 | Henderson | F24C 15/006 |
| | | | | 126/41 R |
| 3,973,551 A | | 8/1976 | Caselani et al. | |
| 4,108,139 A | | 8/1978 | Gilliom et al. | |
| 4,331,124 A | * | 5/1982 | Seidel | F24C 14/025 |
| | | | | 126/21 R |
| 4,375,213 A | * | 3/1983 | Kemp | F24C 15/006 |
| | | | | 219/400 |
| 4,763,638 A | * | 8/1988 | Hurley | A21B 3/00 |
| | | | | 219/400 |
| 4,796,600 A | * | 1/1989 | Hurley | F24C 14/025 |
| | | | | 126/21 R |
| 4,928,663 A | | 5/1990 | Nevin et al. | |
| 2018/0209656 A1 | * | 7/2018 | Paller | F24C 15/322 |

OTHER PUBLICATIONS

English Abstract for CN2555634Y, Total of 1 page.
English Abstract for CN110382956A, Total of 1 page.

* cited by examiner

GAS OVEN

BACKGROUND

Technical Field

The present disclosure is related to a heating apparatus, and more particularly to a gas oven.

Description of Related Art

There are two types of traditional ovens: electric ovens and gas ovens. The heating device of the electric oven is an electric heater which converts electrical energy into heat energy after being energized to heat the baking space of the electric oven. Meanwhile, the heating device of the gas oven is a gas burner which generates heat energy by burning gas to heat the baking space of the gas oven. The gas oven has the advantages of fast heating and less energy consumption compared with the electric oven.

The gas burner of the traditional gas oven burns gas by introducing air to enter the gas burner naturally, which is, the combustion air required for burning gas is introduced into the gas burner through a nozzle. However, the amount of the combustion air introduced by the nozzle is not sufficient to burn the gas completely, resulting in poor gas combustion efficiency and not meeting the needs of energy saving and carbon reduction.

What's more, the high temperature of the casing of the traditional gas oven may not only cause burns when a user accidentally touches the casing but also be transferred to the countertop to raise the temperature of the countertop when the gas oven is embedded into the countertop.

BRIEF SUMMARY

In view of the above, a primary objective of the present disclosure is to provide a gas oven, which could increase the gas combustion efficiency and reduce the temperature of the casing.

The present disclosure provides a gas oven including a casing, an inner oven body, a blower, a branched member, a gas supply pipe, and a combustion device. The casing has a feed opening. The inner oven body disposed in the casing has a baking space which has an open side facing the feed opening. An airflow passage is located around at least a part of the periphery of the inner oven body between the inner oven body and the casing, and the airflow passage has an inlet and an outlet. The blower has a blower outlet communicating with the inlet, in which the blower is adapted to outputting an airflow from the blower outlet. The branched member includes a branched passage having a branched inlet and a branched outlet, in which the branched inlet communicates with the blower outlet. The gas supply pipe for supplying gas has a gas outlet. The combustion device for burning gas is disposed in the baking space at the inner oven body and communicates with the branched outlet and the gas outlet.

One advantage of the present disclosure is that, by utilizing one blower to supply combustion air to the combustion device and cooling air to the airflow passage, not only the amount of the combustion air in the combustion device can be increased and the combustion efficiency can be improved, but the air which passes through the airflow passage can also take away the heat dissipated by the inner oven body to reduce the temperature of the casing. Thereby, it can prevent users from being burned when touching the casing, and it can also reduce the heat transferred from the casing to the countertop when the gas oven is embedded into the countertop.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION

Figure 1:
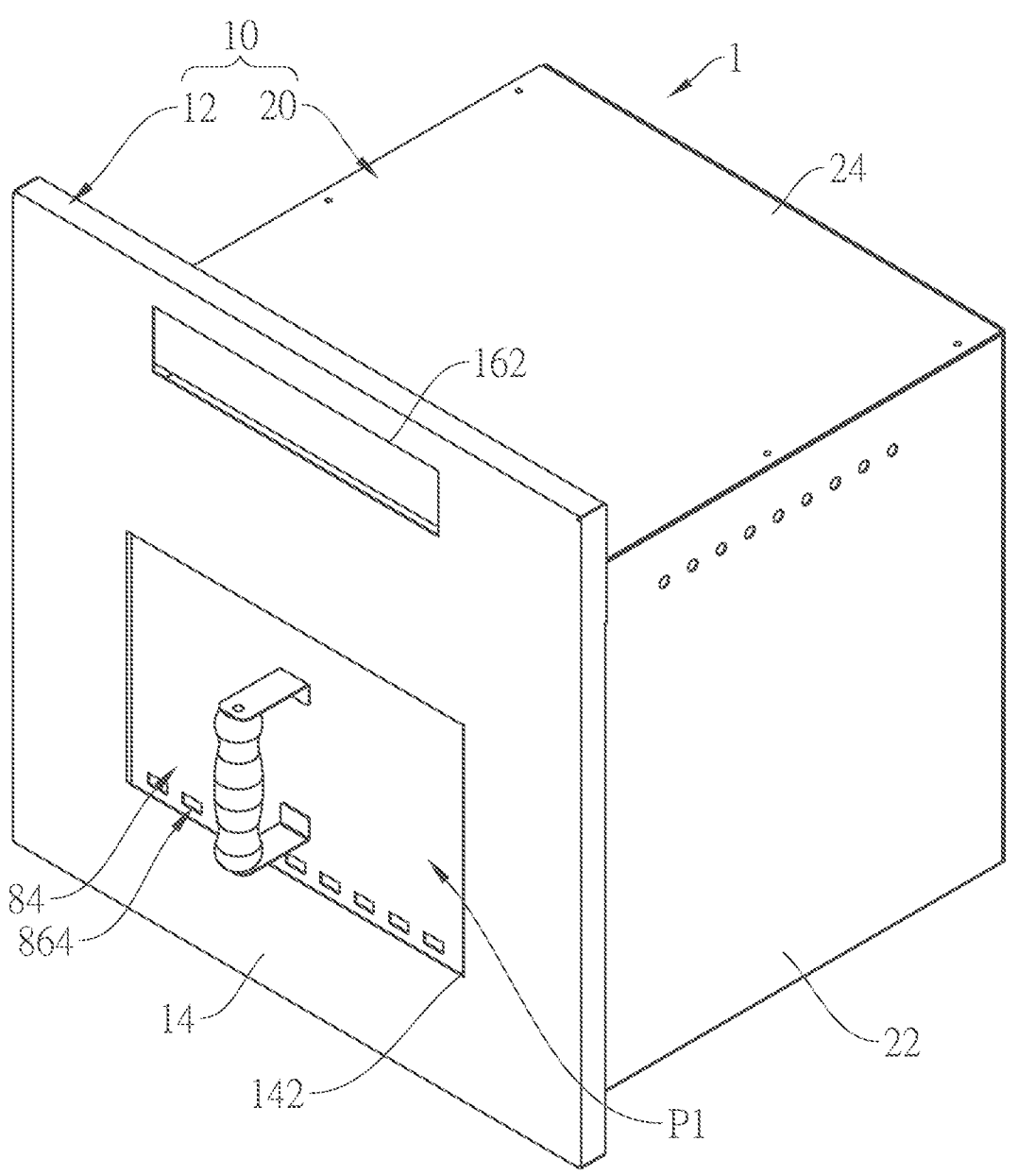
FIG. 1 is a perspective view of a gas oven of a first embodiment according to the present disclosure.
Figure 2:
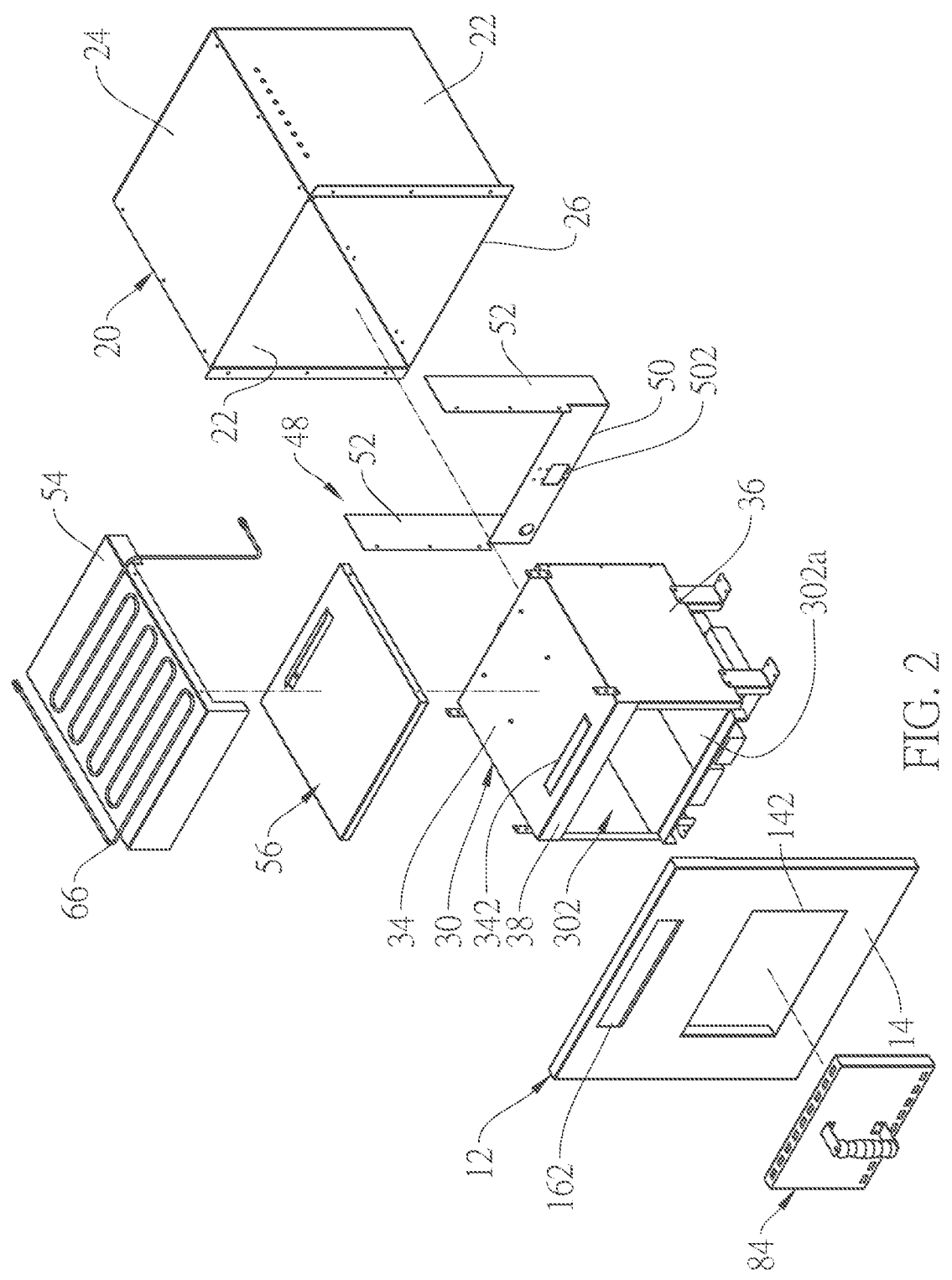
FIG. 2 is an exploded perspective view of the gas oven of the first embodiment.
Figure 3:
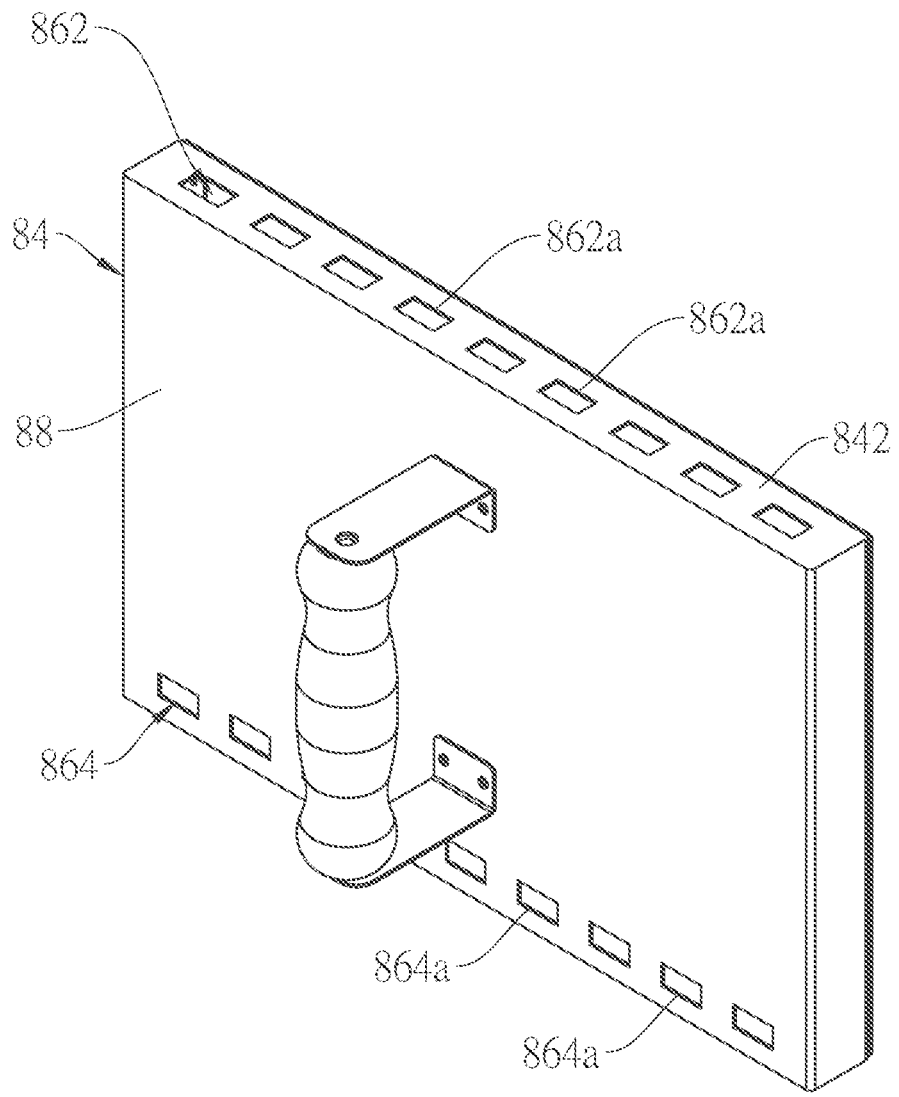
FIG. 3 is a perspective view of a door of the first embodiment.
Figure 4:
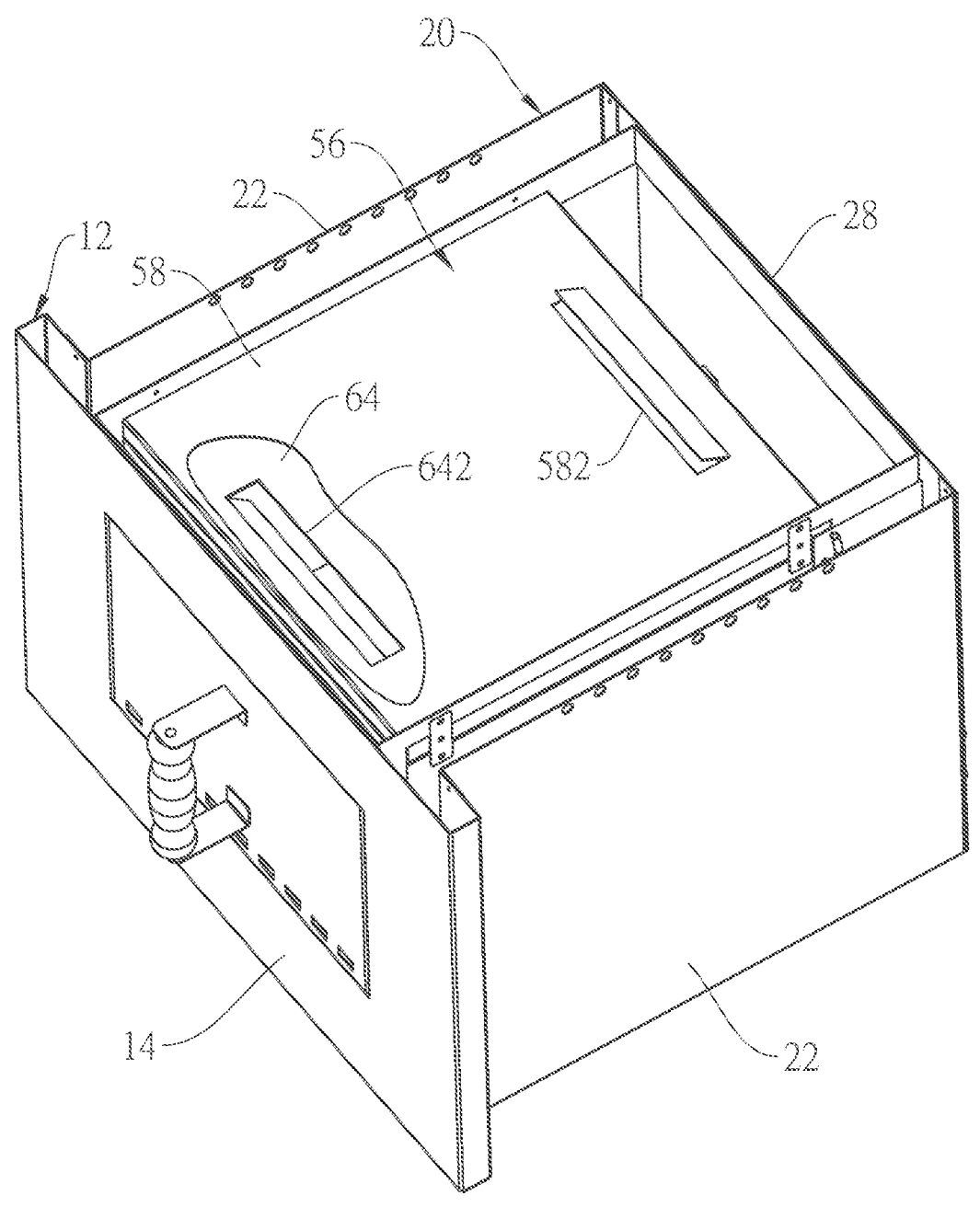
FIG. 4 is a partial cross-sectional view of the gas oven of the first embodiment.
Figure 5:
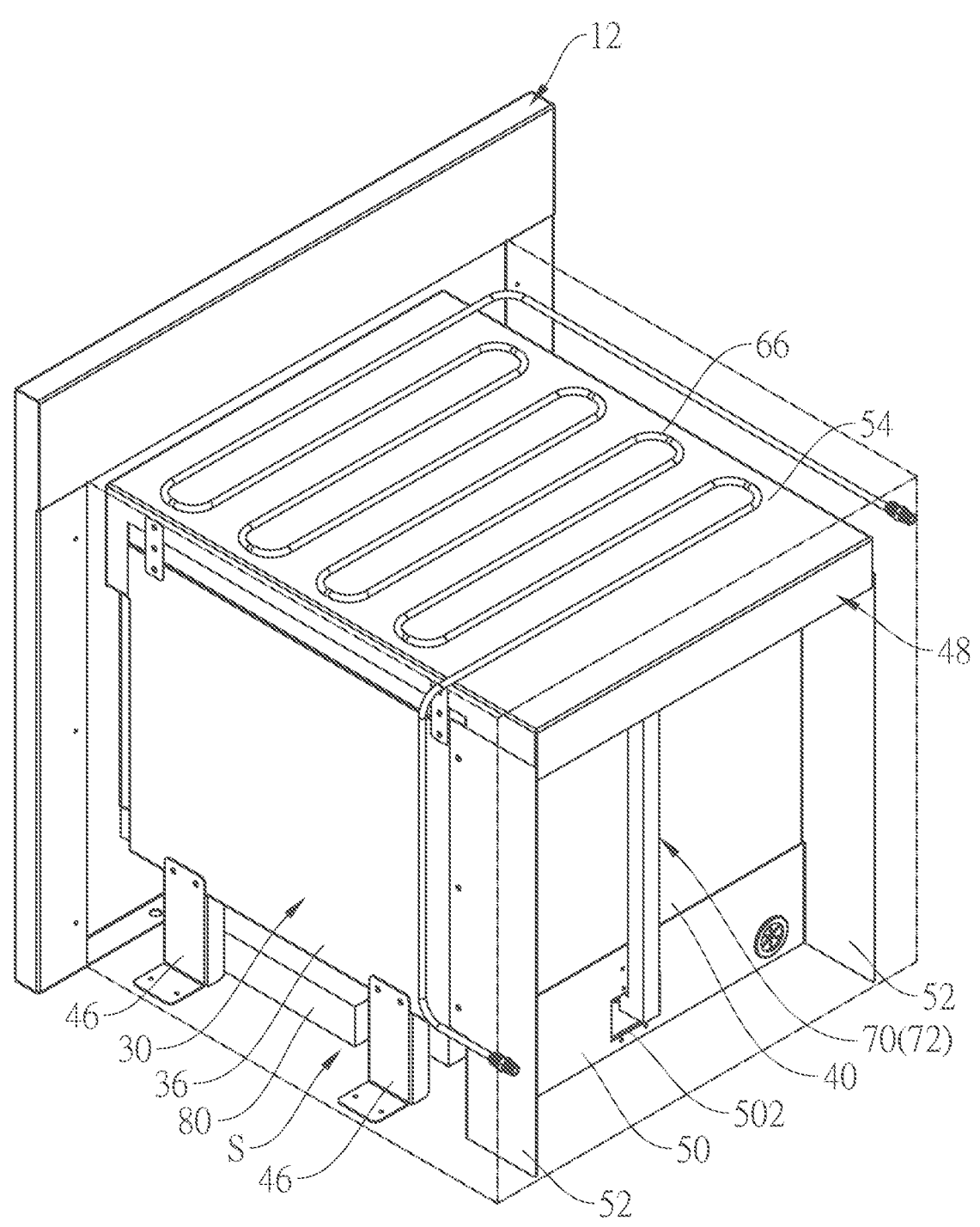
FIG. 5 is another perspective view of the gas oven of the first embodiment, in which a gas supply pipe is not shown.
Figure 6:
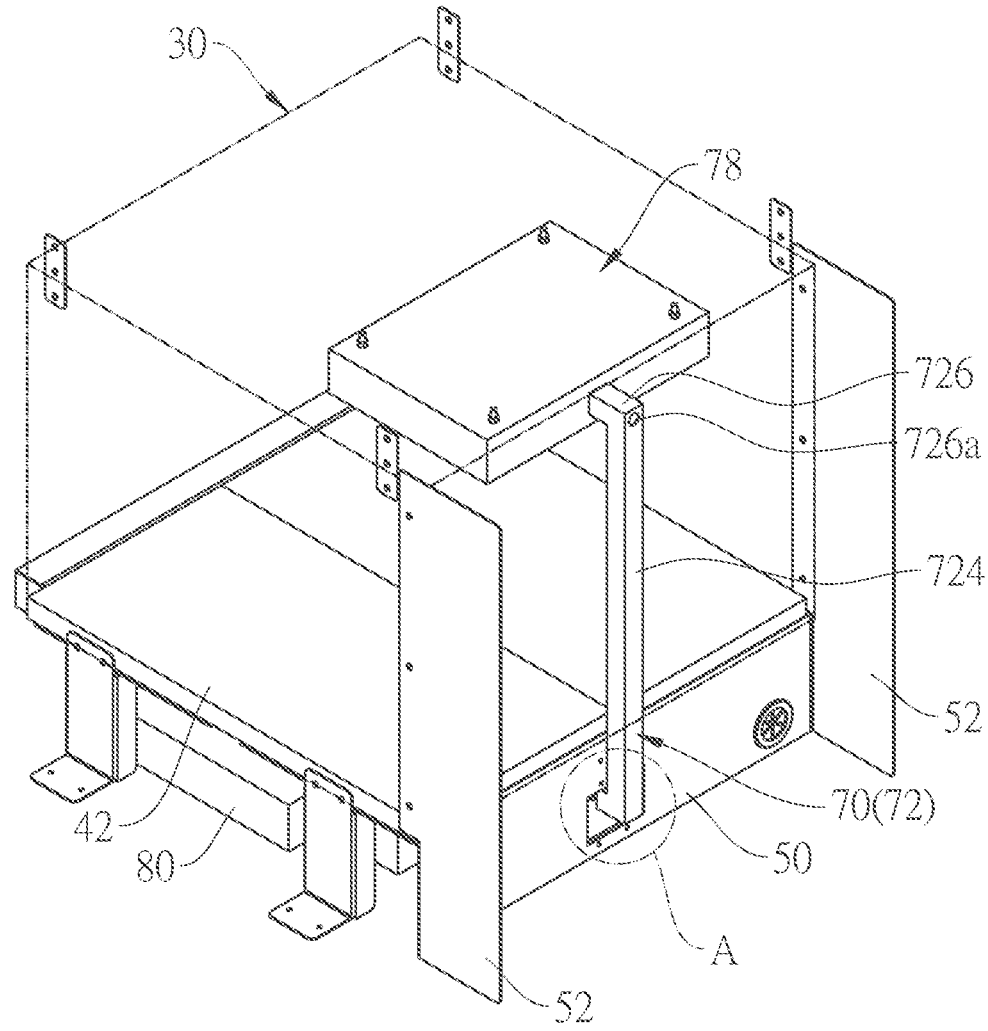
FIG. 6 is a perspective view of an inner oven body and a partition assembly of the first embodiment, in which the gas supply pipe is not shown.
Figure 7:
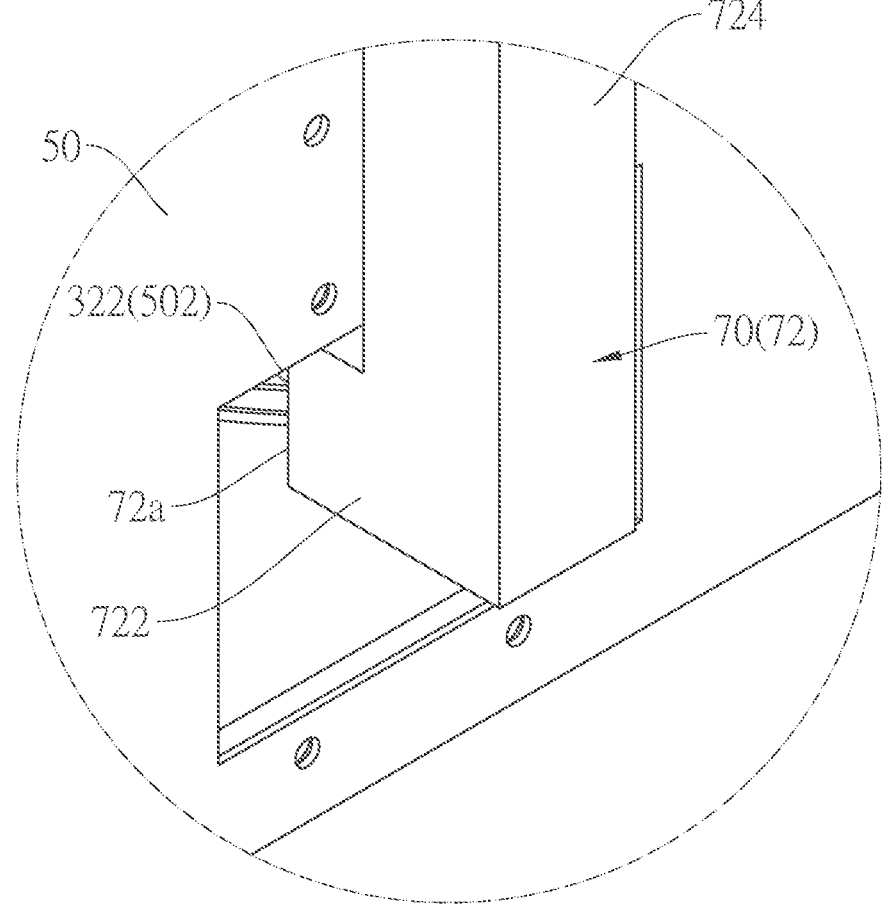
FIG. 7 is a partial enlarged view of part A of FIG. 7.
Figure 8:
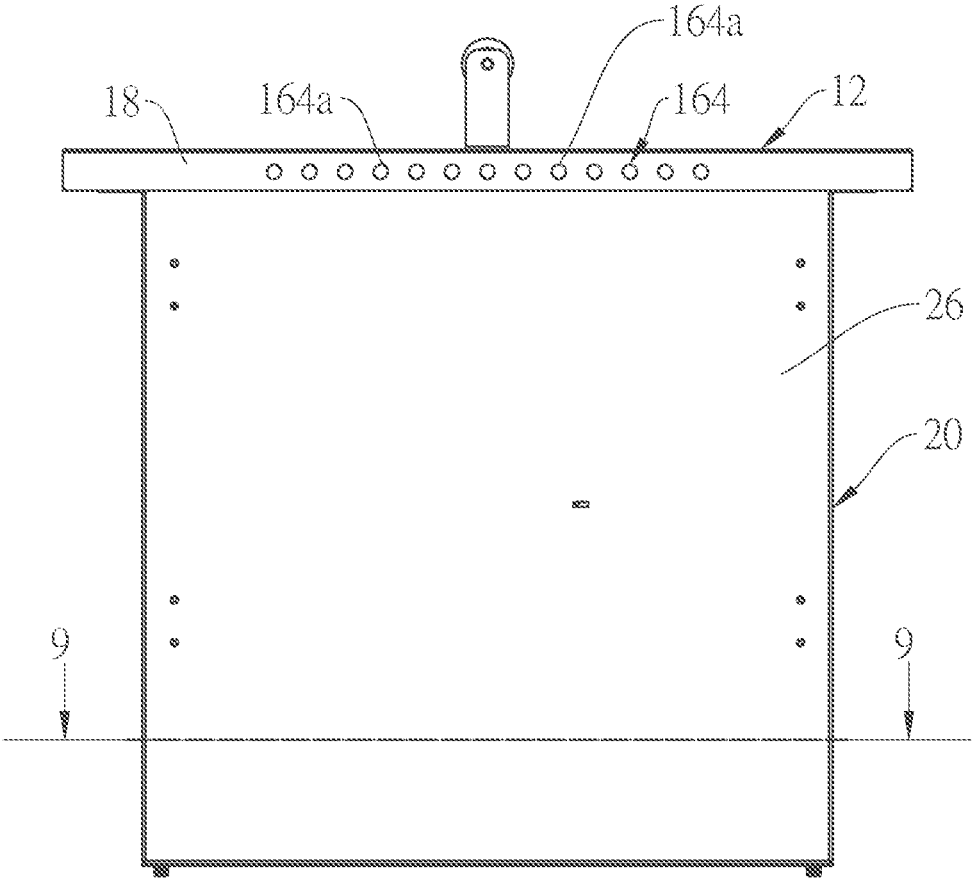
FIG. 8 is a bottom view of FIG. 1.

The following illustrative embodiments and drawings are provided to illustrate the disclosure of the present invention, these and other advantages and effects can be clearly understood by persons skilled in the art after reading the disclosure of this specification.

A gas oven 1 of the first embodiment according to the present disclosure is shown in FIG. 1 to FIG. 16, where the gas oven which can be embedded into a countertop comprises a casing 10, an inner oven body 30, a blower 68, a branched member 70, a gas supply pipe 74, and a combustion device 78.

The casing 10 includes a front casing body 12 and a rear casing body 20, where a height and a width of the front casing body 12 are both greater than those of the rear casing body 20. In the direction from a front end to a rear end of the gas oven 1, a length of the front casing body 12 is less than that of the rear casing body 20. The front casing body 12 has a front panel 14 which forms the front end of the gas oven 1 and has a feed opening 142 for users to put in foods to be baked. The casing 10 has at least one vent communicating with an outside of the gas oven 1. In the current embodiment, the front casing body 12 has the at least one vent which includes a plurality of vents including a first vent 162 and a second vent 164. The first vent 162 is located at the front panel 14 above the feed opening 142 while the second vent 164 is located at a bottom part of the front casing body 12. In the current embodiment, the second vent 164 is located at a bottom plate 18 of the front casing body 12 and is formed by a plurality of vent holes 164a facing downwards, but not limited thereto, the second vent 164 can also be located at a bottom part of the front panel 14 below the feed opening 142. The rear casing body 20 is formed by a plurality of plates including two side case plates 22, a top case plate 24, a bottom case plate 26, and a rear case plate 28. One side of the rear casing body 20 is attached to the front casing body 12, and the rear case plate 28 forms the rear end of the gas oven 1. In one embodiment, the at least one vent of the casing 10 can also be located at the rear casing body 20.

The inner oven body 30 is disposed in the casing 10 and has a baking space 302 which has an open side 302a facing the feed opening 142. An airflow passage 32 is located around at least a part of the periphery of the inner oven body 30 between the inner oven body 30 and the casing 10. The airflow passage 32 has an inlet 322 and an outlet 324. The airflow passage 32 extends along the rear, the upper, and a part of the front of the inner oven body 30, but is not limited thereto, the airflow passage 32 can also extend to both sides of the inner oven body 30.

In the current embodiment, the inner oven body 30 is located in the rear casing body 20, and a bottom part of the inner oven body 30 is elevated relative to the bottom case plate 26 of the rear casing body 20 by a plurality of frames 46. The inner oven body 30 includes a top plate 34, two side plates 36, a front plate 38, a rear plate 40, and at least one carrier plate 42. The top plate 34 has a first exhaust vent 342 communicating with the baking space 302. The first exhaust vent 342 has a first side edge 342a and a second side edge 342b, in which the second side edge 342b is closer to the combustion device 78 than the first side edge 342a. The inner oven body 30 further includes a guide plate 44 located in the baking space 302, in which the guide plate 44 is attached to the first side edge 342a of the first exhaust vent 342 and inclined towards the second side edge 342b from the first side edge 342a.

Figure 13:
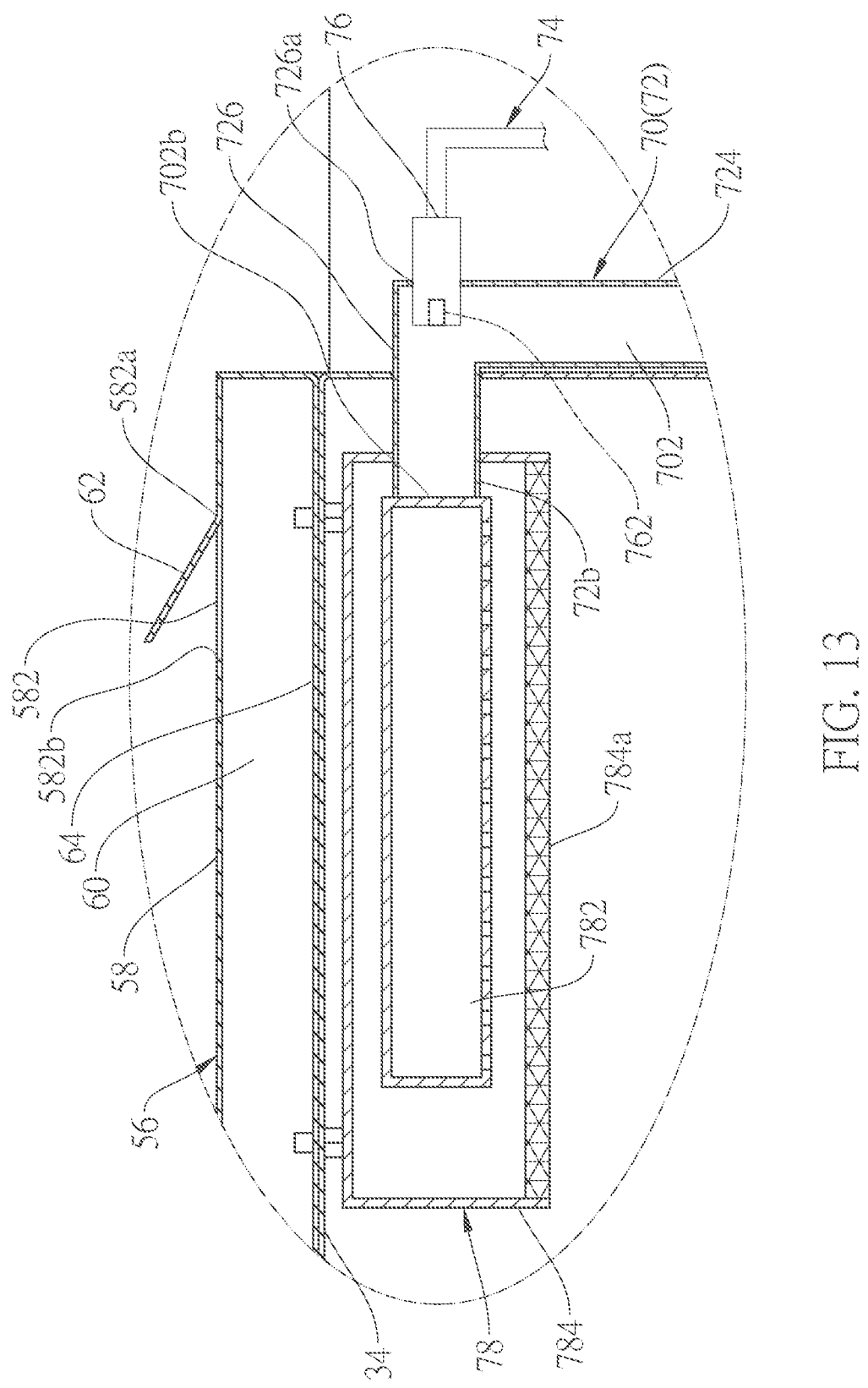
FIG. 13 is a partial enlarged view of part C of FIG. 12.
Figure 14:
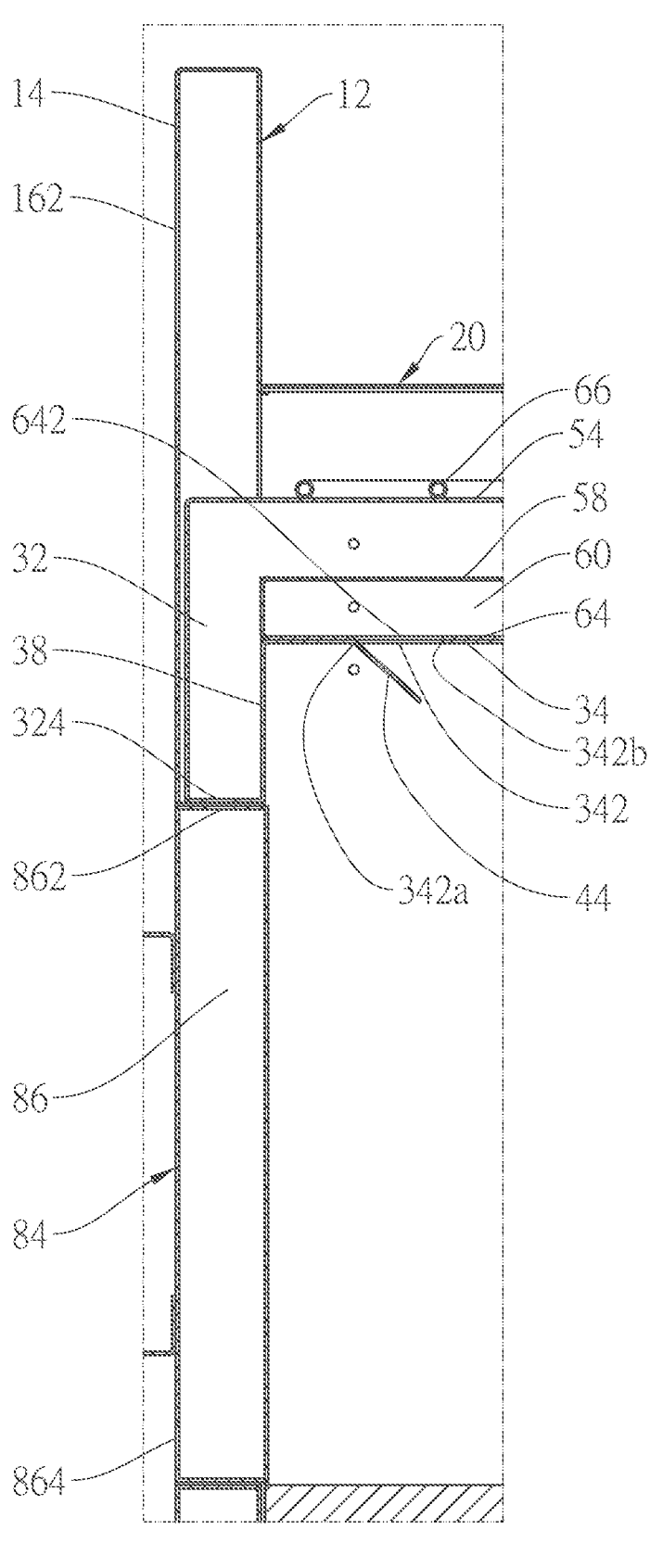
FIG. 14 is a partial enlarged view of part D of FIG. 12.
Figure 15:
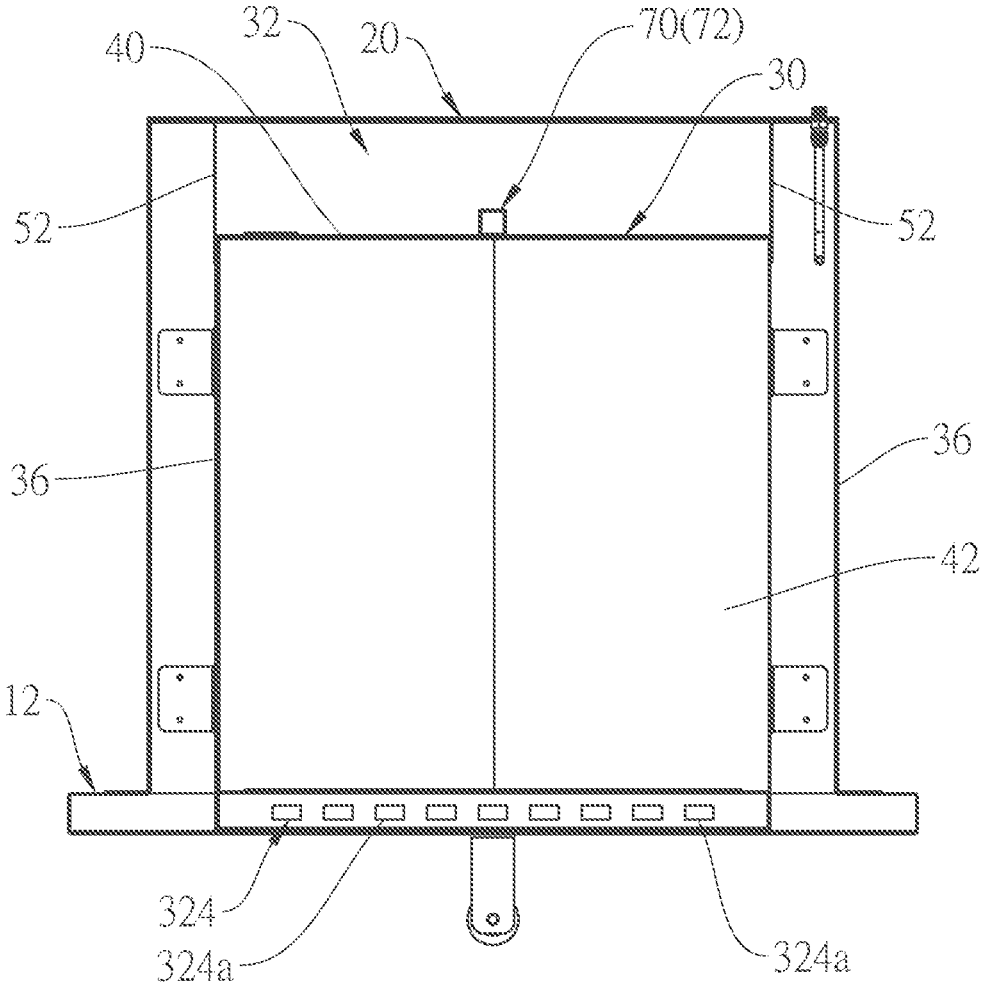
FIG. 15 a cross-sectional view of FIG. 10 along lines 15-15.

The open side 302a of the baking space 302 is located below the front plate 38. The rear plate 40 is opposite the front plate 38, and the carrier plate 42 is for placing foods to be baked. There are gaps between the surrounding areas of the inner oven body 30 on the upper, lower, left, right, and rear sides, and the corresponding plates of the rear casing body 20. The spaces on the left, right, and bottom sides of the inner oven body 30 are in communication with the first vent 162 and the second vent 164 of the front casing body 12 of the casing 10. A part of the airflow passage 32 exists between the front plate 38 and the front panel 14. As shown in FIG. 13 and FIG. 14, the outlet 324 of the airflow passage 32 is located between the front panel 14 and the front plate 38 above the feed opening 142, in which the outlet 324 is formed by a plurality of vent holes 324a, but not limited thereto.

The gas oven 1 in the current embodiment further includes a partition assembly 48 disposed between the rear casing body 20 and the inner oven body 30. The partition assembly 48 is adapted to separating a portion of the airflow passage 32 in the rear space and the upper space of the inner oven body 30. The partition assembly 48 includes a partition 50 and two side partitions 52, where the partition 50 is connected to the inner oven body 30 and the casing 10 and separates the inner oven body 30 and the casing 10 to form an accommodating space S which communicates with the at least one vent hole 162 and 164. The accommodating space S is adapted to accommodating the blower 68, a control device 80, and a gas valve 82, in which the control device 80 is electrically connected to the gas valve 82 and the blower 68, and is configured to control the gas valve 82 to regulate the gas flow and the speed of the blower 68. More specifically, the partition 50 is connected to the rear plate 40 of the inner oven body 30 and the bottom case plate 26 of the casing 10, and the accommodating space S is located below the inner oven body 30. The partition 50 has an opening 502 forming the inlet 322 of the airflow passage 32. The two side partitions 52 are respectively attached to one of two sides of the inner oven body 30. In the current embodiment, the two side partitions 52 are respectively attached to one of two side plates 36 of the inner oven body 30 near the rear plate 40, that is, the two side partitions 52 are respectively located at both sides of a rear end of the inner oven body 30. The rear plate 40 of the inner oven body 30, the two side partitions 52, the partition 50, and the rear case plate 28 of the casing 10 together define a portion of the airflow passage 32.

The gas oven 1 in the current embodiment further includes an exhaust assembly 56 disposed at a top part of the inner oven body 30 and located in the airflow passage 32. The exhaust assembly 56 has a second exhaust vent 582 and an exhaust passage 60, in which the second exhaust vent 582 communicates with the first exhaust vent 342 via the exhaust passage 60. More specifically, the exhaust assembly 56 includes an upper cover plate 58 having the second exhaust vent 582, and the exhaust passage 60 is located below the upper cover plate 58. The second exhaust vent 582 includes a first side edge 582a and a second side edge 582b, in which the first side edge 582a is closer to the rear plate 40 of the inner oven body 30 than the second side edge 582b. The exhaust assembly 56 further includes a guide plate 62 and a lower cover plate 64, in which the guide plate 62 is located in the airflow passage 32 and attached to the first side edge 582a of the second exhaust vent 582b. The guide plate 62 is inclined towards the second side edge 582b from the first side edge 582a. The lower cover plate 64 is located below the upper cover plate 58, and the exhaust passage 60 is located between the upper cover plate 58 and the lower cover plate 64. The lower cover plate 64 abutting against the top plate 34 of the inner oven body 30 has an air inlet 642 which communicates with the first exhaust 342 of the top plate of the inner oven body 30.

In addition, to reduce the convection that the heat of the exhaust assembly 56 convects to the top case plate 24 of the casing 10, the partition assembly 48 further includes an upper partition 54 located above the upper cover plate 58 of the exhaust assembly 56 in the partition assembly 48. Wherein, a front end of the upper partition 54 is connected to the front panel 14 of the front casing body 12 while a rear end of the upper partition 54 is connected to the rear case plate 28 of the rear case body 20 to form the airflow passage 32 which is located above and in front of the inner oven body 30, and a bottom surface of the upper partition 54 forms a part of a wall of the airflow passage 32.

In the current embodiment, the gas oven 1 further includes a water cooling tube 66, and at least a part of the water cooling tube 66 is disposed at a top surface of the upper partition 54, but not limited thereto, the water cooling tube 66 can also be disposed at a bottom surface of the upper partition 54 inside the airflow passage 32. The heat dissipated from the upper partition 54 can be taken away through the water cooling tube 66, further reducing the temperature of the top case plate 24 of the casing 10.

Figure 9:
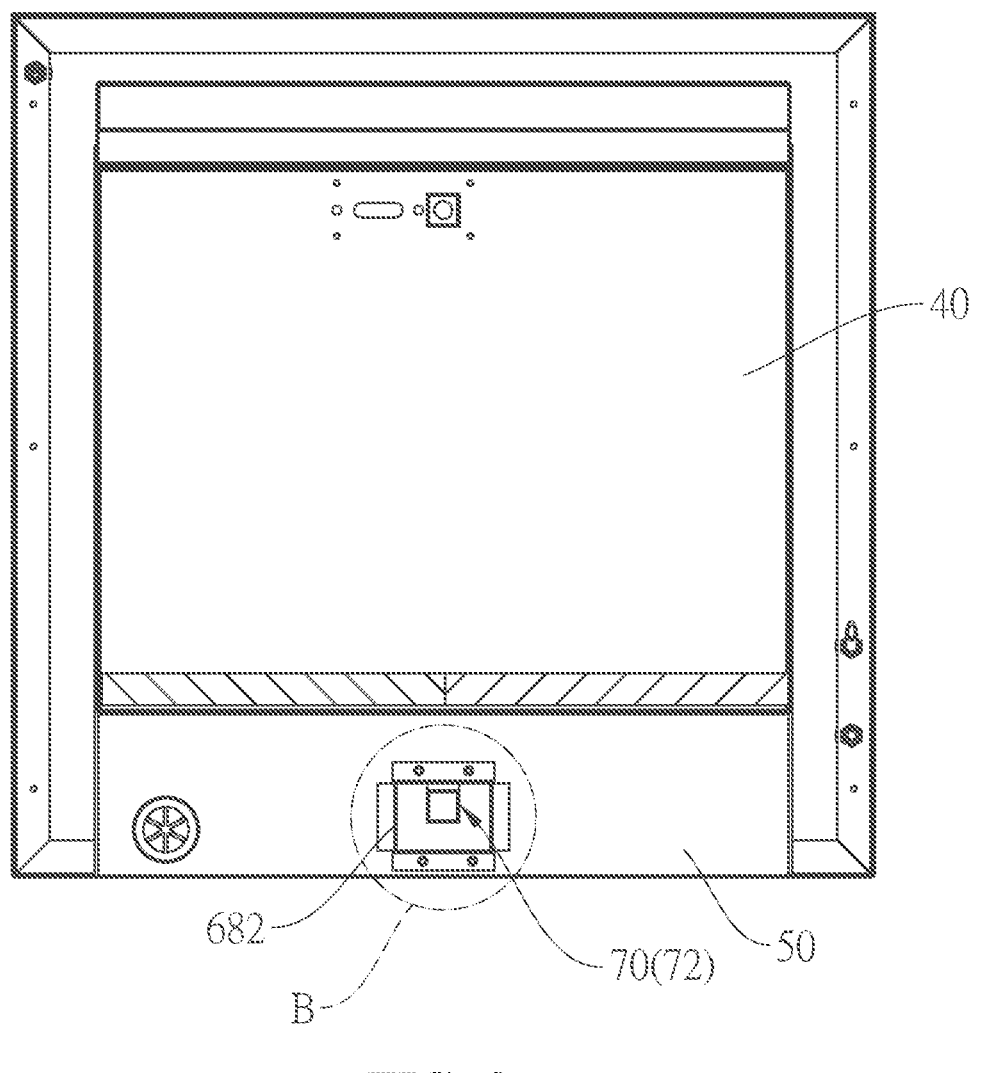
FIG. 9 is a cross-sectional view of FIG. 8 along lines 9-9.
Figure 10:
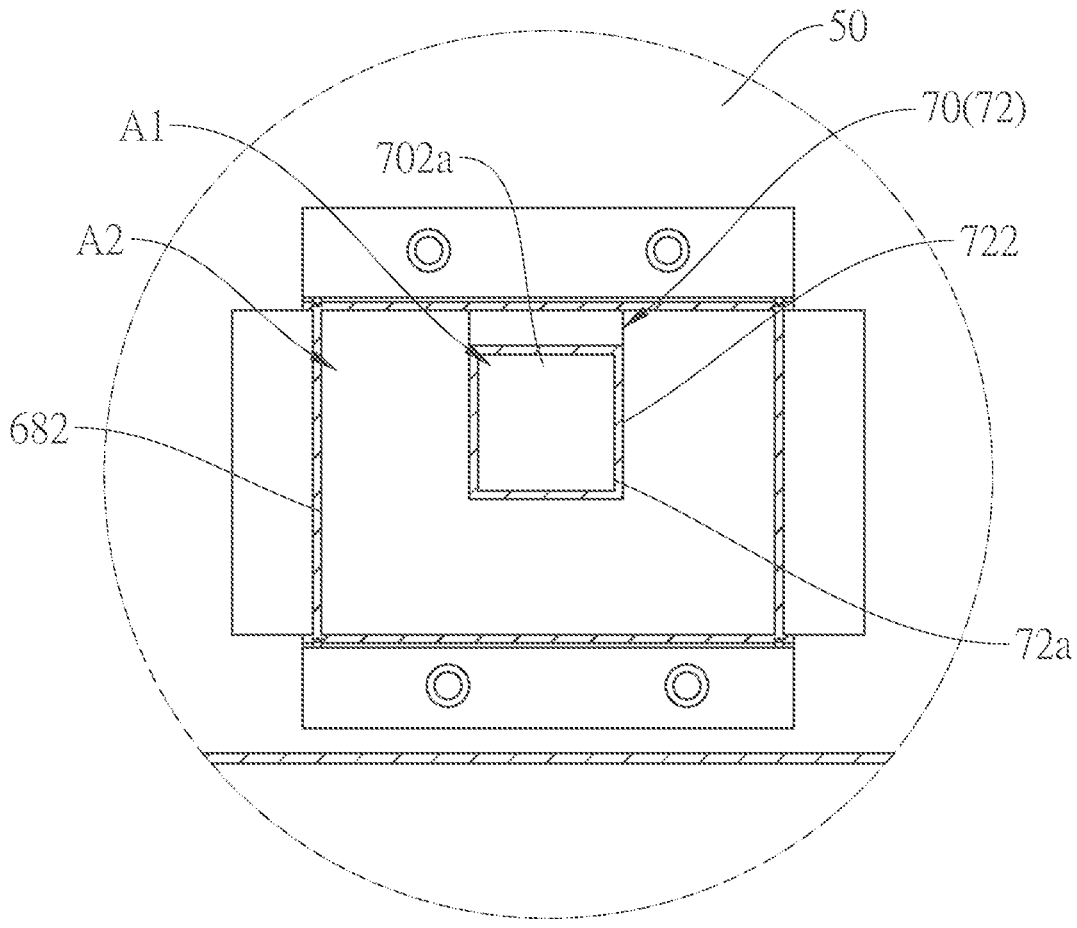
FIG. 10 is a partial enlarged view of part B of FIG. 9.
Figure 11:
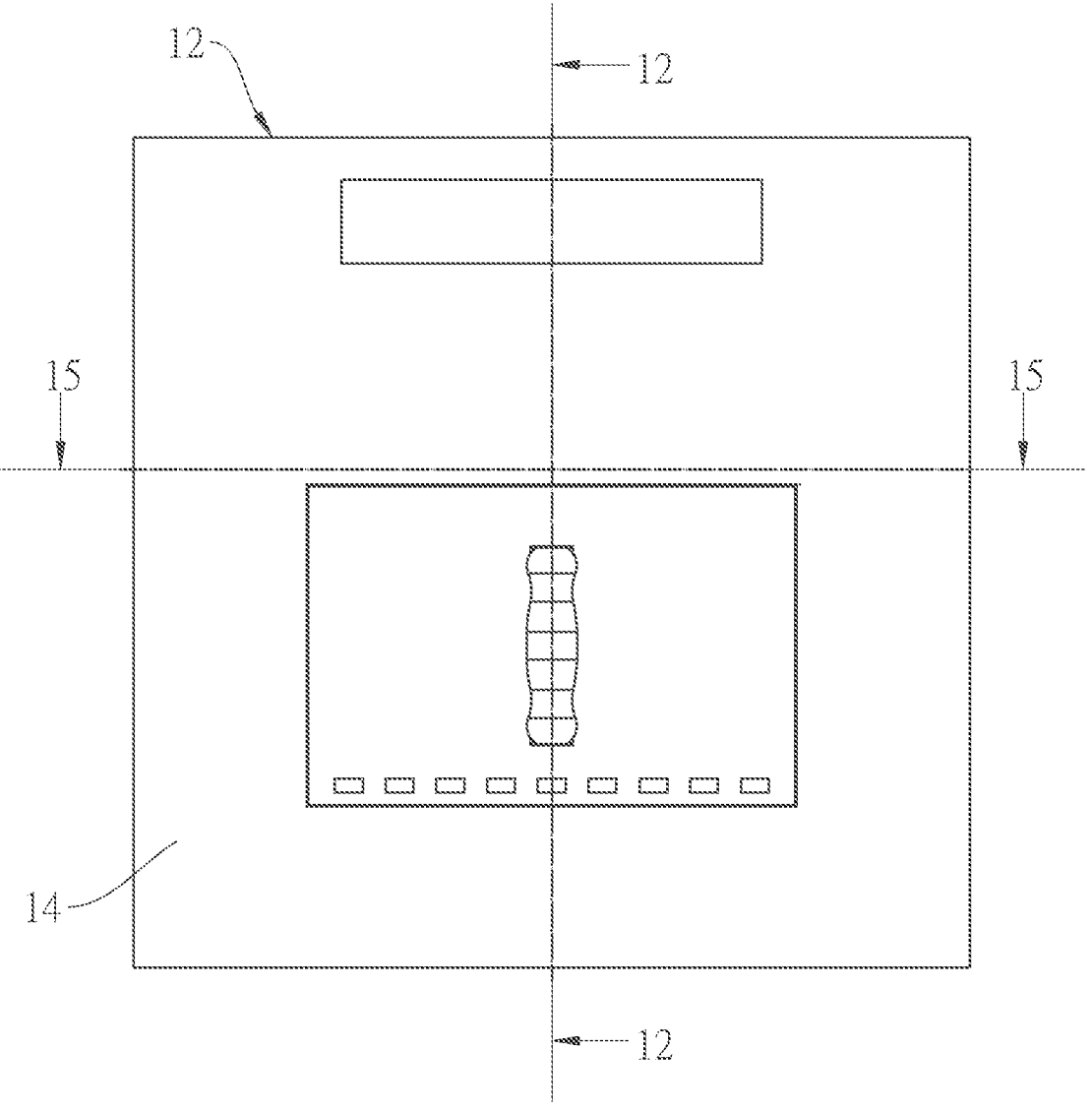
FIG. 11 is a front view of FIG. 1.

The blower 68 has a blower outlet 682 communicating with the inlet 322, in which the blower 68 is adapted to outputting an airflow from the blower outlet 682. The blower 68 is located in the accommodating space S and the blower outlet 682 faces the opening 502. Preferably, as shown in FIG. 9 and FIG. 10, a periphery of the blower outlet 682 of the blower 68 is attached to that of the opening 502 of the partition 50. The blower 68 is controllable by the control device 80 to adjust the speed, thereby changing the amount of the airflow output from the blower outlet 682.

The branched member 70 includes a branched passage 702 having a branched inlet 702*a* and a branched outlet 702*b*, in which the branched inlet 702*a* communicates with the blower outlet 682. In the current embodiment, the branched member 70 is a branched tube 72 having a first end 72*a* and a second end 72*b*, in which the first end 72*a* has the branched inlet 702*a* while the second end 72*b* has the branched outlet 702*b*. The first end 72*a* of the branched tube 72 faces the blower outlet 682, and at least a part of the branched tube 72 is located in the airflow passage 32. More specifically, the branched tube 72 includes an inlet section 722, an extension section 724, and an outlet section 726, in which the inlet section 722 has the first end 72*a*, and the first end 72*a* of the inlet section 722 is located at the opening 502. In the current embodiment, the example where the inlet section 722 passes through the opening 502 is provided, but not limited thereto. The objective of the branch can be achieved as long as the inlet section 722 is located near the opening 502 and the branched inlet 702*a* faces the blower outlet 682. As shown in FIG. 9, the branched inlet 702*a* of the first end 72*a* of the branched tube 72 has a first opening area A1 and the blower outlet 682 has a second opening area A2, in which the second opening area A2 is four times or more than the first opening area A1. Thereby, most of the airflow from the blower 68 is injected into the airflow passage 32, while a small portion of the airflow is injected into the branched passage 702. In the current embodiment, the second opening area A2 is seven times or more than the first opening area A1.

The extension section 724 is located in the airflow passage 32 at a rear side of the rear plate 40 of the inner oven body 30 and extends upwards. A bottom part of the extension section 724 is connected to the inlet section 722. One end of the outlet section 726 forms the second end 72*b* and passes through the combustion device 78, while the other end of the outlet section 726 is connected to the extension section 724 and has a through hole 726*a* corresponding to the second end 72*b* of the outlet section 726.

Figure 12:
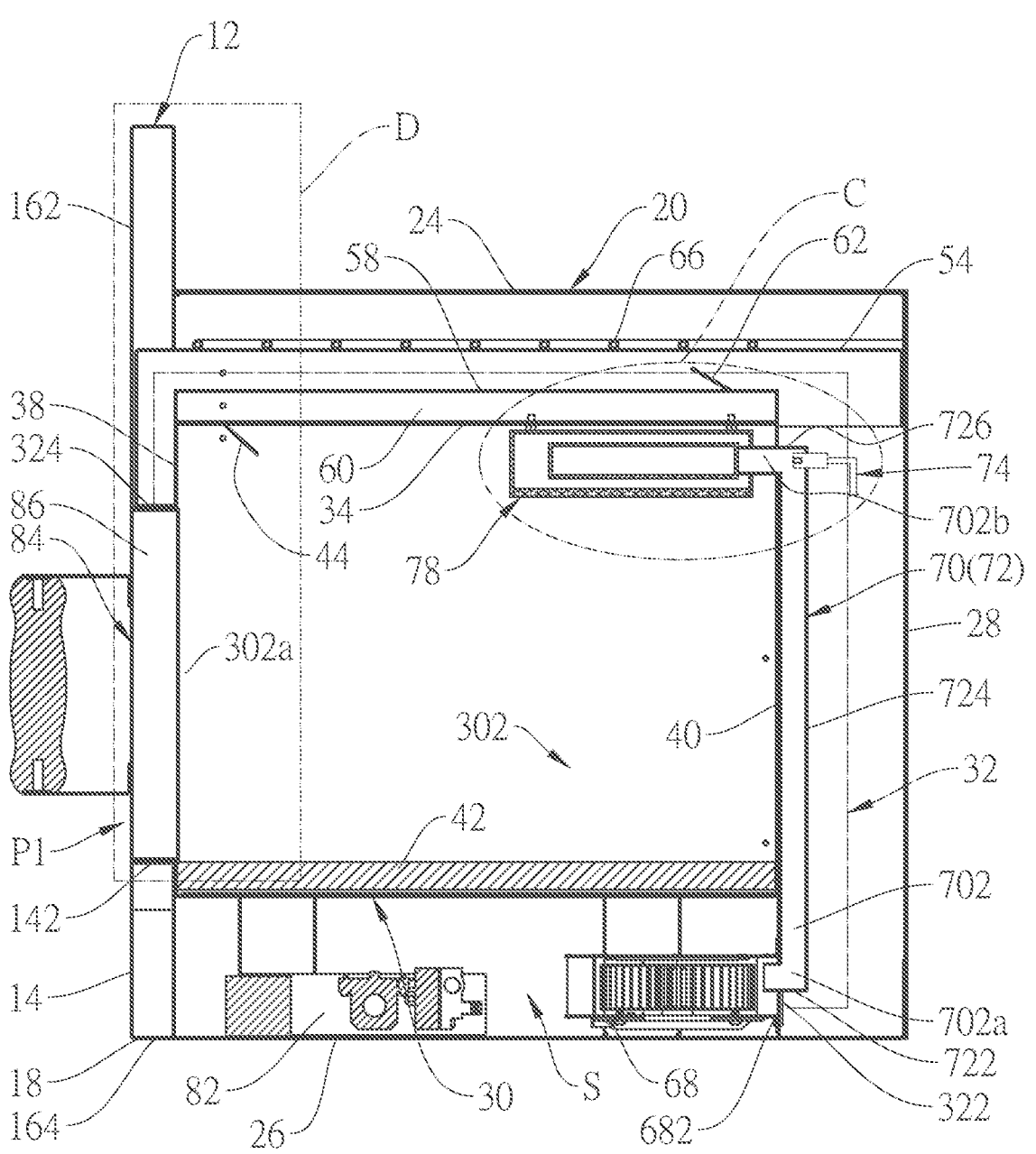
FIG. 12 is a cross-sectional view of FIG. 10 along lines 12-12.

As shown in FIG. 12 and FIG. 13, the gas supply pipe 74 for supplying gas is connected to the gas valve 82 and has a gas outlet 762. In the current embodiment, the gas supply pipe 74 includes a nozzle 76 having the gas outlet 762, in which the nozzle 76 passes through the through hole 726*a* of the outlet section 726 of the branched tube 72 and the gas outlet 762 is located inside the outlet section 726.

The combustion device 78 is disposed in the baking space 302 at the inner oven body 30 and communicates with the branched outlet 702*b* and the gas outlet 762. In the current embodiment, the combustion device 78 includes at least one burner 782 and a cover body 784, in which the burner 782 is disposed inside the cover body 784 and communicates with the branched outlet 702*b* of the outlet section 726 of the branched tube 72. The burner 784 communicates with the gas outlet 762 via the outlet section 726 of the branched tube 72 and burns gas to generate flame. To ignite gas, the cover body 784 can be provided with an ignitor (not shown). The cover body 784 has a metal mesh 784*a* at a bottom part thereof. The flame generated by the burner 782 heats the metal mesh 784*a* and escapes through the mesh apertures of the metal mesh 784*a* to heat the baking space 302.

Optionally, the gas oven 1 includes a door 84 pivotally mounted at the front case body 12 of the casing 10 and located at the feed opening 142. For example, the door 84 can be pivotally mounted at the front case body 12 by means of a pivot assembly (not shown), such as a pivot axle. An interior of the door 84 includes an air passage 86 having an air inlet 862 and an air outlet 864. The air inlet 862 is located at a top part 842 of the door 84 and the air outlet 864 communicates with the air passage 86 and an outside. In the current embodiment, the air inlet 862 is located at the top part 842 of the door 84 and formed by a plurality of vent holes 862*a*, while the air outlet 864 is located at an outer panel 88 and formed by a plurality of vent holes 864*a*. The door 84 is pivotable between a first position P1 and a second position P2. At the first position P1, the door 84 closes the feed opening 142 and establishes communication between the air inlet 862 and the outlet 324 of the airflow passage 32. At the second position P2, the door 84 opens the feed opening 142 and the air inlet 862 is away from the outlet 324 of the airflow passage 32.

Figure 16:
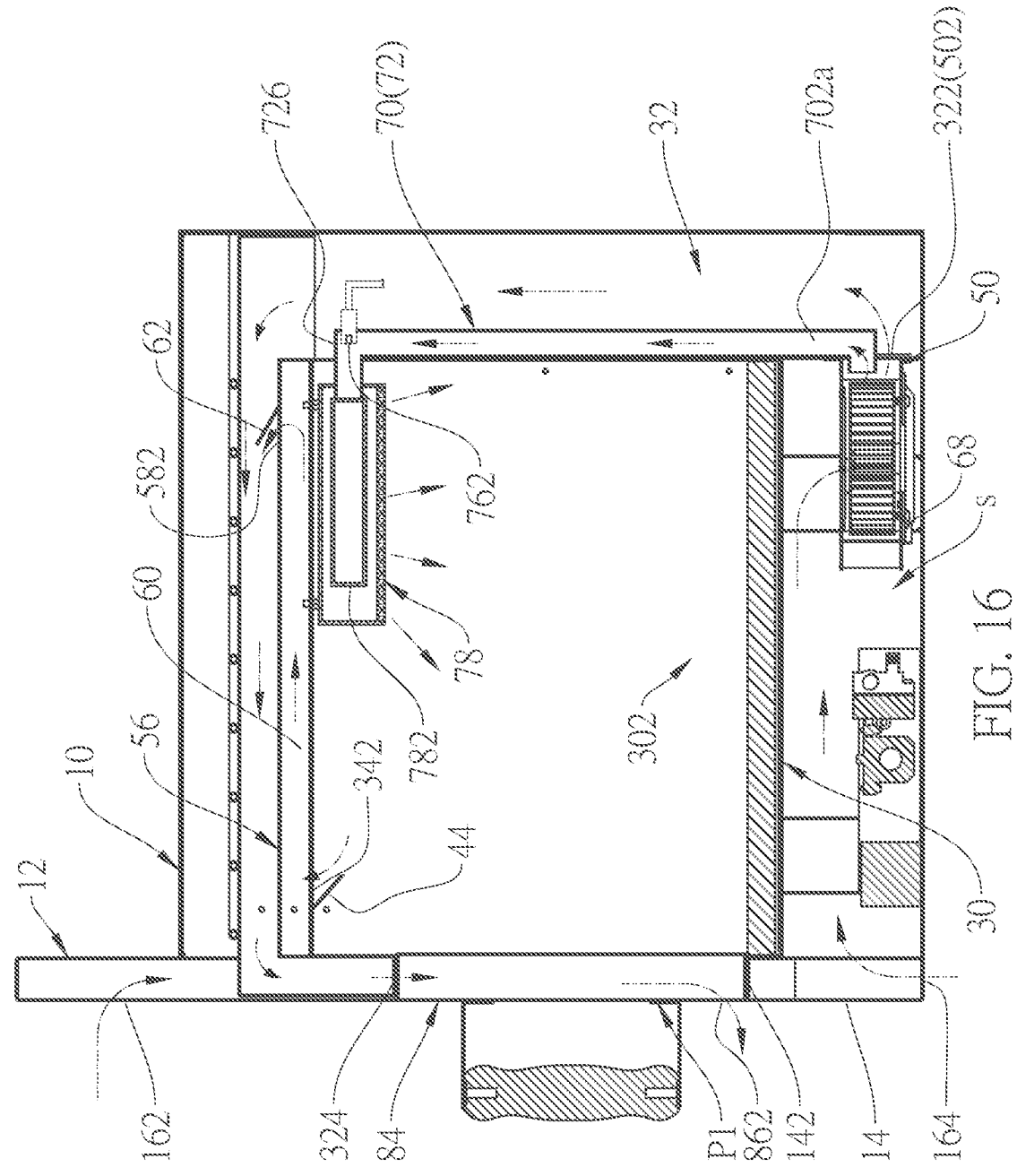
FIG. 16 is a schematic view of the gas oven of the first embodiment, showing how the air flows when the door is closed.

With the above-described structure, as shown in FIG. 16, when the blower 68 is activated, for example, by the control device 80, the blower 68 introduces air into the accommodating space S from the first vent 162 and the second vent 164 of the front case body 12 of the casing 10. The introduced air can lower the temperature of the front panel 14 of the front case body 12 and the temperature of the accommodating space S. The blower 68 draws the air within the accommodating space and outputs the airflow to the inlet 322 of the airflow passage 32. Since the branched inlet 702*a* of the branched member 70 is located at the opening 502 of the partition 50, one part of the airflow gets into the branched passage 702 of the branched member 70 and the other part of the airflow gets into the airflow passage 32. The airflow in the branched passage 702 is mixed with the gas output by the gas outlet 762 in the outlet section 726, and then is injected into the burner 782 of the combustion device 78, thereby the combustion air can be increased to enhance the combustion efficiency.

The hot air generated after combustion is guided by the guide plate 44 into the exhaust passage 60 of the exhaust assembly 56 via the first exhaust vent 342, then into the airflow passage 32 via the second exhaust vent 582 of the exhaust assembly 56, and is mixed with the air from the rear side of the inner oven body 40. Thereby, the temperature of the hot air exhausted from the exhaust assembly 56 can be reduced. It is worth mentioning that the direction where the guide plate 62 of the exhaust assembly 56 is inclined is the same as the direction where the airflow flows so that the hot air exhausted from the second exhaust vent 582 can be guided forward via a bottom surface of the guide plate 62. A top surface of the guide plate 62 acts as a barrier, preventing the air from the rear side of the inner oven body 30 from affecting the flow of the hot air exhausted from the second exhaust vent 582. The air in the airflow passage 32 is exhausted from the outlet 324 located above the feed opening 142. Thereby, the heat dissipated by the inner oven body 30 can be taken away.

When the door 84 is located at the first position P1, the air at the outlet 324 of the airflow passage 32 flows into the air passage 86 via the air inlet 862 of the door 84 and is then exhausted outside via the air outlet 864 of the door 84. Thereby, the heat accumulated at the door 84 can be taken away to reduce the temperature of the door 84.

Figure 17:
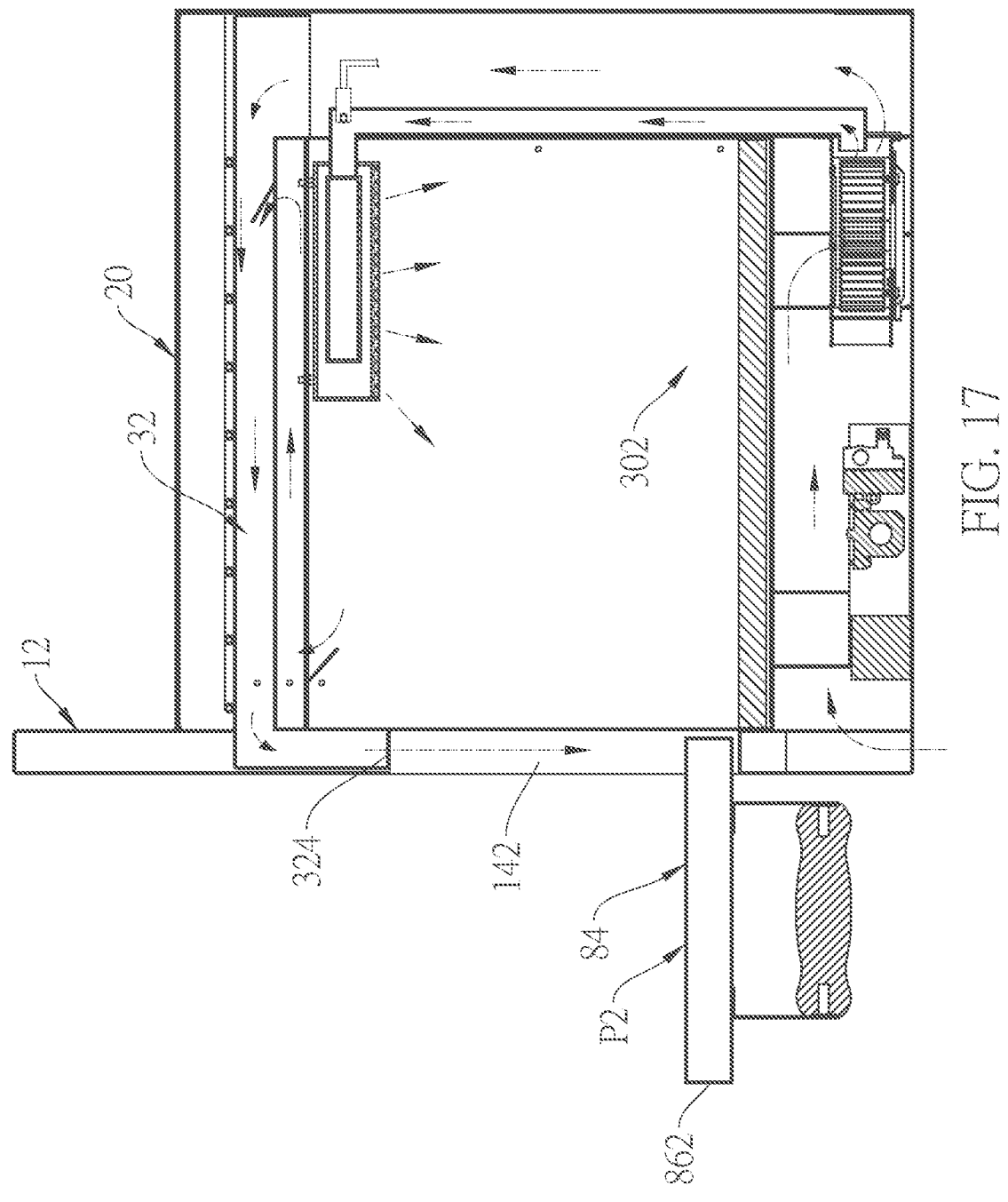
FIG. 17 is a schematic view of the gas oven of the first embodiment, showing how the air flows when the door is open.

As shown in FIG. 17, when the door 84 is open (located at the second position P2), the air inlet 862 of the door 84 is away from the outlet 324 of the airflow passage 32 so that the air in the airflow passage 32 is exhausted from the outlet 324 located above the feed opening 142. Thereby, an air curtain can be formed at the feed opening 142, reducing the temperature of the hot air escaping from the baking space 302 and/or preventing the hot air in the baking space 302 from directly escaping outside, so as to avoid the hot air from scalding users.

Figure 18:
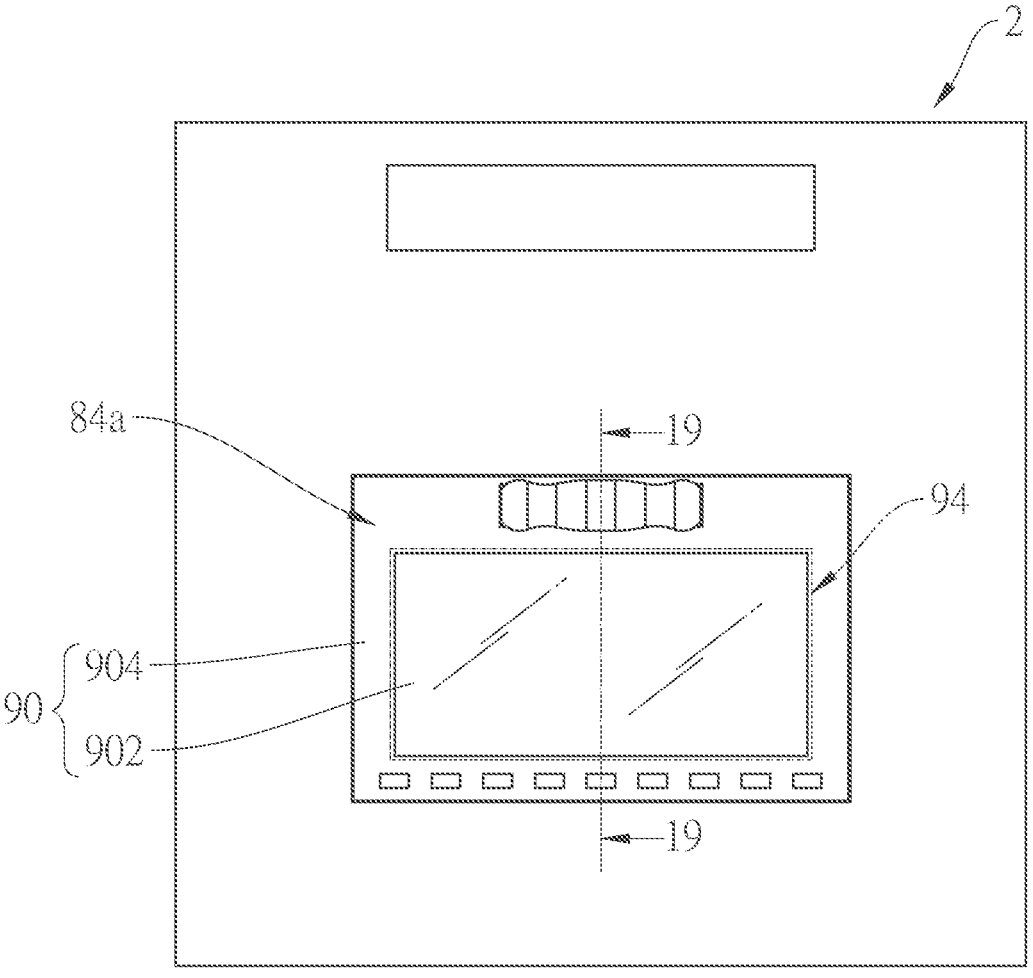
FIG. 18 is a front view of a gas oven of a second embodiment according to the present disclosure.
Figure 19:
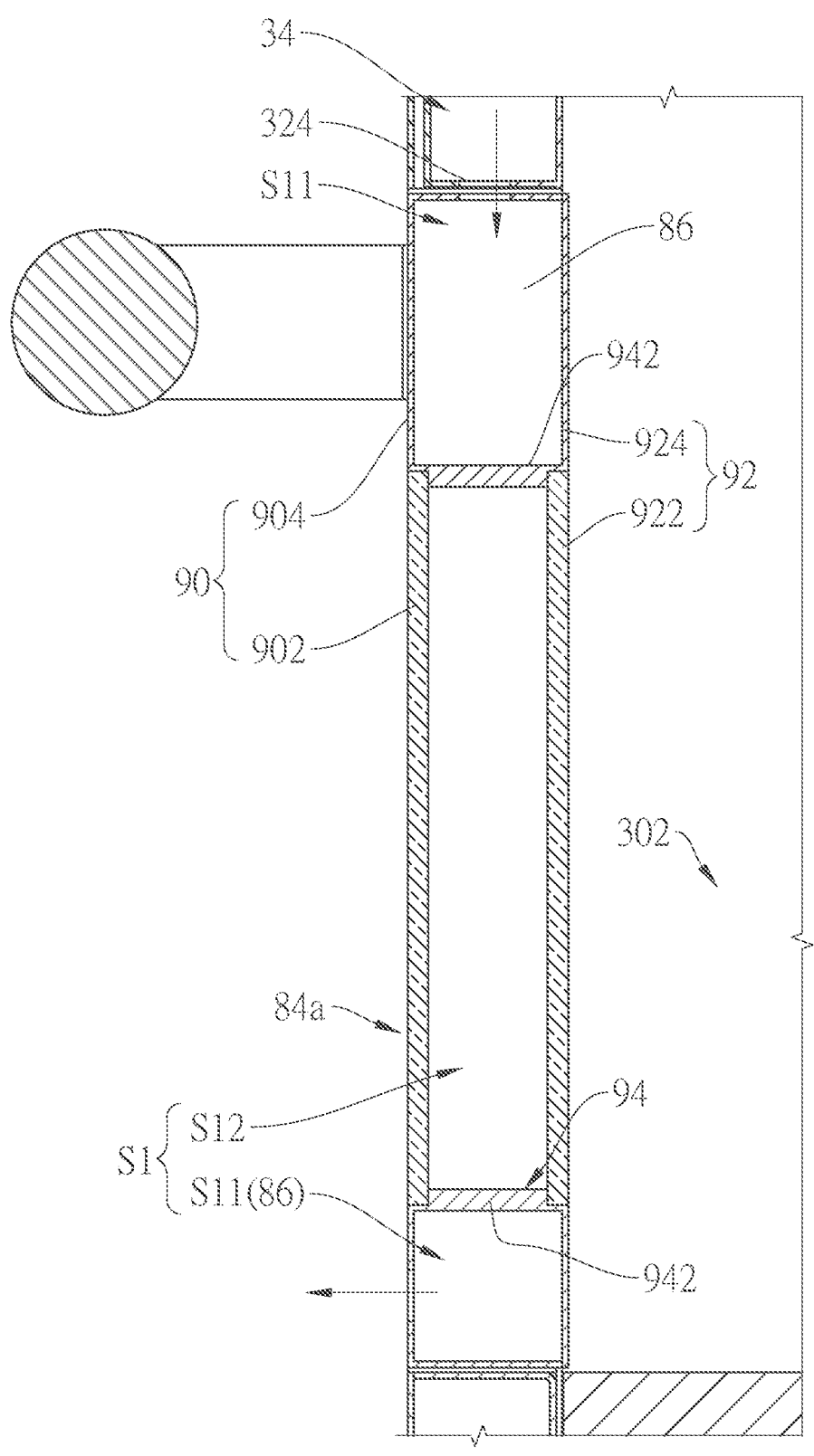
FIG. 19 is a cross-sectional view of FIG. 18 along lines 19-19.

A gas oven 2 of a second embodiment according to the present disclosure is shown in FIG. 18 and FIG. 19, wherein the gas oven 2 has a similar structure as the gas oven 1 of the first embodiment, except that the door 84a in the current embodiment includes an outer panel 90, an inner panel 92, and a partition member 94, and a sandwiched space S1 exists between the outer panel 90 and the inner panel 92. The outer panel 90 includes an outer glass 902 and an outer plate 904 which is opaque, while the inner panel 92 includes an inner glass 922 and an inner plate 924 which is opaque. The outer glass 902 is attached to the outer plate 904 and seals an opening of the outer plate 904, while the inner glass 922 is attached to the inner plate 924 and seals an opening of the inner plate 924. Thereby, the outer glass 902 and the inner glass 922 respectively form an outer transparent area and an inner transparent area so that users can observe the baking space 302 through the outer transparent area and the inner transparent area.

The partition member 94 is attached between the outer panel 90 and the inner panel 92 and divides the sandwiched space S1 into a first space S11 and a second space S12. The first space S11 forms the air passage 86, while the second space S12 is located between the outer glass 902 and the inner glass 922. Preferably, the partition member 94 is attached to the opaque part of the outer panel 90 and that of the inner panel 92. In the current embodiment, the partition member 94 includes a plurality of sealing plates 942, two sides of each sealing plate 942 are respectively attached to the outer plate 904 and the inner plate 924. The plurality of sealing plates 942 form a fixed frame to secure the outer glass 902 and the inner glass 922 and surround the second space S12. The plurality of sealing plates 942 separate the first space S11 and the second space S12. The airflow exhausted from the outlet 324 of the airflow passage 32 is directed to the exterior only through the first space S11 (the air passage 86) and does not enter the second space S12. Thereby, it prevents impurities carried by the airflow exhausted from the outlet 324 from adhering to a surface of the outer glass 902 and that of the inner glass 922 which face the second space S12, causing contamination.

In practice, the outer panel 90 can be a glass plate, wherein a part of the glass plate is provided with a light-blocking coating or a light-blocking element to block light, while the other part of the glass plate without a light-blocking coating or a light-blocking element forms the outer transparent area. Similarly, the inner panel 92 can also be a glass plate, wherein a part of the glass plate is provided with a light-blocking coating or a light-blocking element to block light, while the other part of the glass plate without a light-blocking coating or a light-blocking element forms the inner transparent area.

Figure 20:
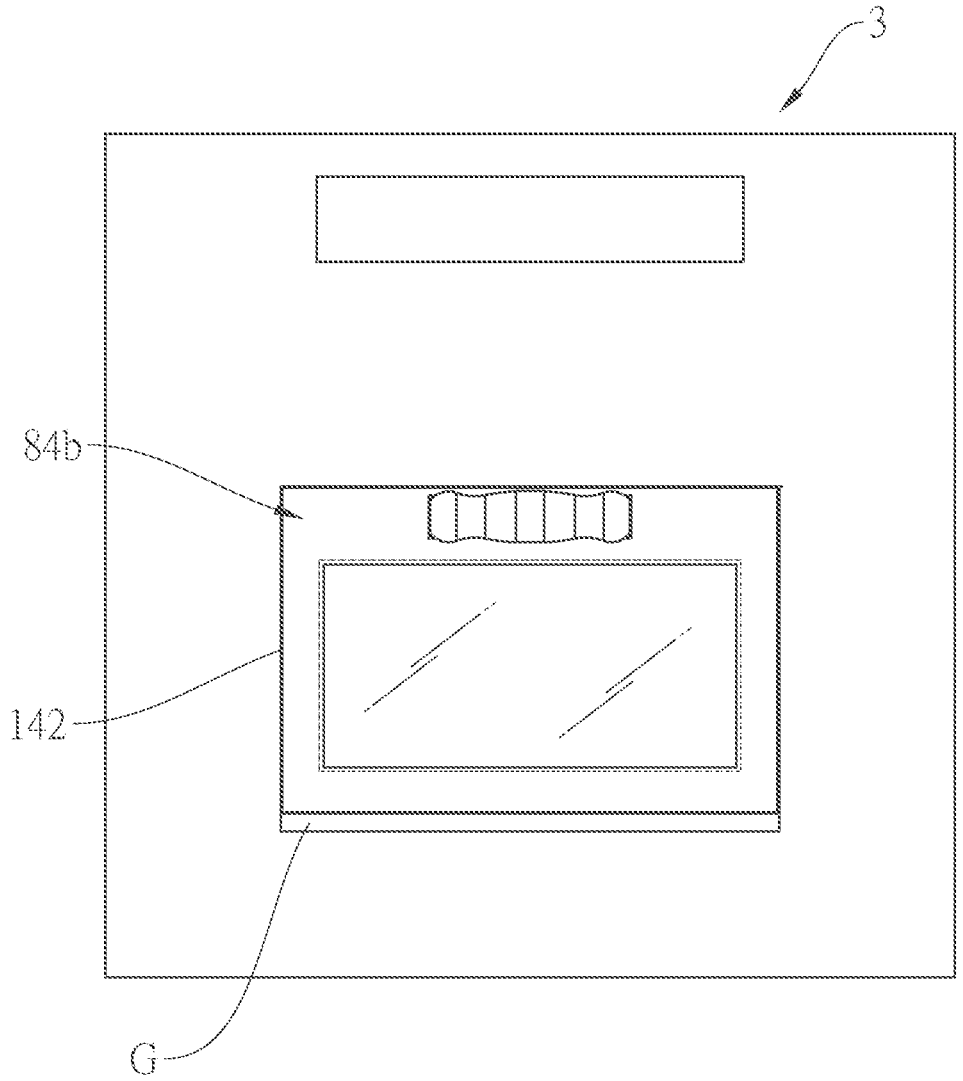
FIG. 20 is a front view of a gas oven of a third embodiment according to the present disclosure.
Figure 21:
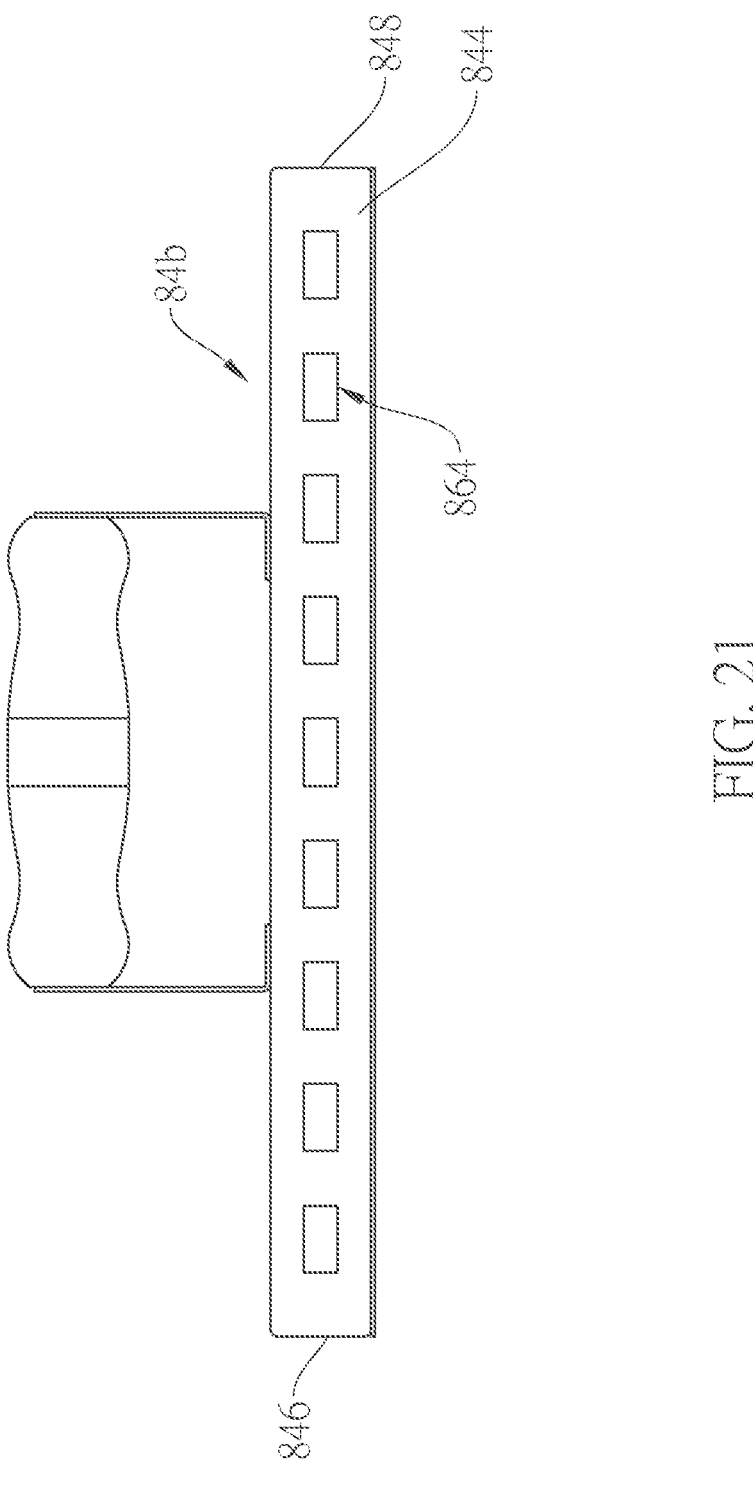
FIG. 21 is a bottom view of a door of the third embodiment.

A gas oven 3 of a third embodiment according to the present disclosure is shown in FIG. 20 and FIG. 21, wherein the gas oven 3 has a similar structure as the gas oven 2 of the second embodiment, except that the air outlet 864 of the door 84b in the current embodiment is located at a bottom part 844 (or a bottom side part) of the door 84b. Thereby, the air can be exhausted from the bottom part 844 of the door 84b. Preferably, a gap G for exhaust exists between the bottom part 844 of the door 84b and the feed opening 142 to facilitate air exhaust.

In practice, the air outlet 864 can be located at the left side part 846 or the right side part 848 of the door 84b. Alternatively, two or three of the left side part 846, the right side part 848, and the bottom part 844 are provided with the air outlets 864.

The location of the air outlet 864 in the current embodiment can also be applied to the door 84 in the first embodiment.

Figure 22:
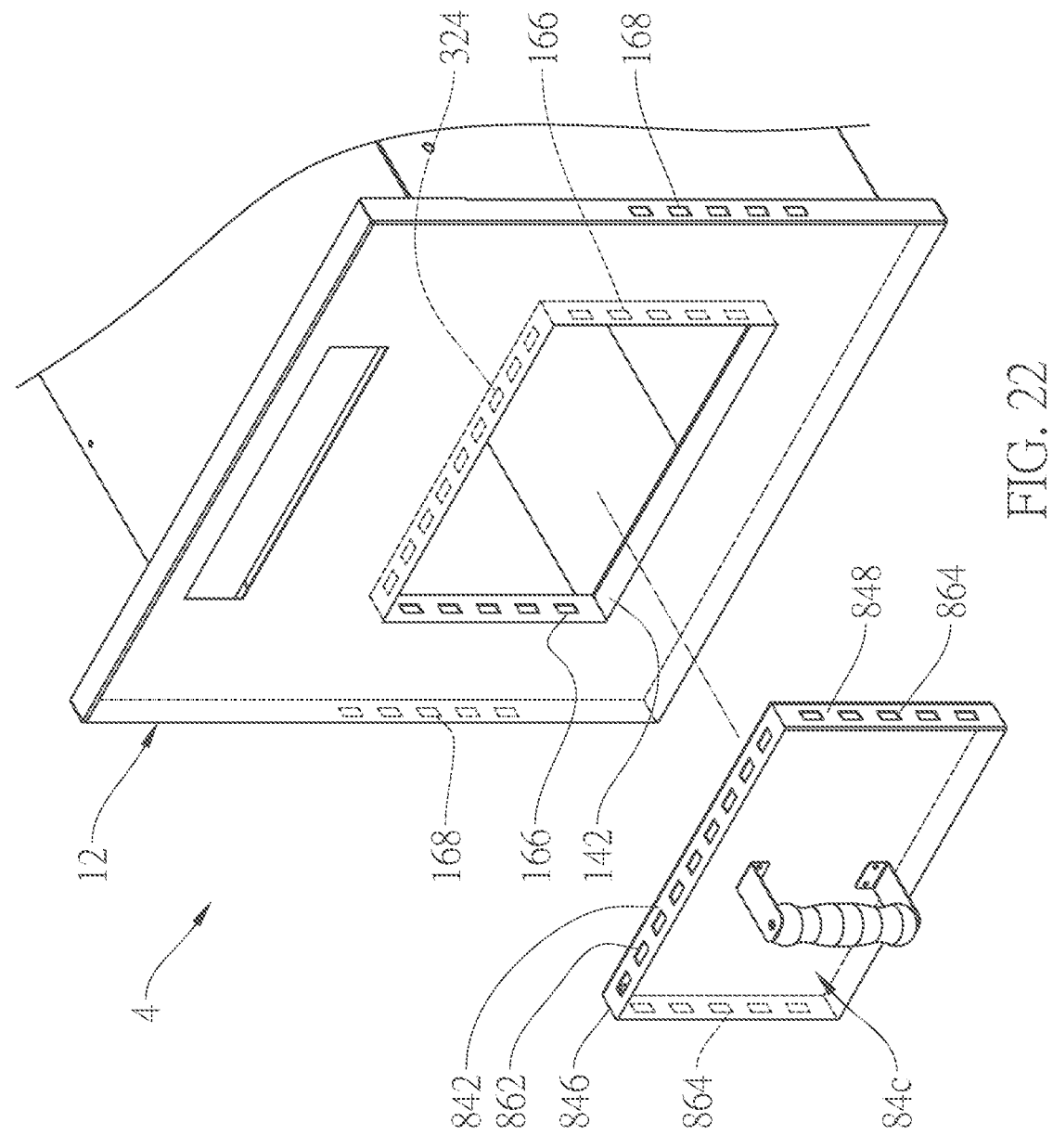
FIG. 22 is a gas oven of a fourth embodiment according to the present disclosure.

A gas oven 4 of a fourth embodiment according to the present disclosure is shown in FIG. 22, wherein the gas oven 4 has a similar structure as the gas oven 1 of the first embodiment, except that at least one side part of the door 84c has the air outlet 864. In the current embodiment, the left side part 846 and the right side part 848 of the door 84c are both provided with the air outlets 864. The front case body 12 has at least one connecting vent 166 around the feed opening 142. In the current embodiment, the surroundings on both sides of the feed opening 142 are respectively provided with one connecting vent 166. The front case body 12 has a terminal vent 168 on at least one side. In the current embodiment, two sides of the front case body 12 are respectively provided with one terminal vent 168. Each of the terminal vents 168 communicates with each of the connecting vents 166 via an internal space of the front case body 12.

When the door 84c is at the first position P1, the plurality of the air outlets 864 correspond to the plurality of the connecting vents 166, and the plurality of the air outlets 864 communicate with the outside via the plurality of connecting vents 166 and the plurality of terminal vents 168. Thereby, when the door 84c is closed, the airflow from the first exhaust vent 342 is exhausted outside via the air inlet 862 of the top part 842 of the door 84c, the air outlets 864 of the left side part 846 and the right side part 848, the plurality of connecting vents 166, and the plurality of terminal vents 168.

The locations of the air outlets 864, the connecting vents 166, and the terminal vents 168 in the current embodiment can be applied to the second embodiment. The air outlets 864 can be located at the bottom part (or the bottom side part) of the door 84c, while the connecting vent 166 can be located at the bottom side of the feed opening 142, corresponding to the air outlet 864.

As described above, by introducing external air through the blower, the gas oven of the present disclosure can supply air to the combustion device and to the airflow passage, not only increasing the combustion air of the combustion device to enhance the combustion efficiency, but also taking away the heat dissipated by the inner oven body to reduce the temperature of the casing.

It must be pointed out that the embodiments described above are only example embodiments of the present invention. All equivalent structures which employ the concepts disclosed in this specification and the appended claims should fall within the scope of the present invention.

What is claimed is:

1. A gas oven, comprising:
a casing having a feed opening;
an inner oven body disposed in the casing and having a baking space which has an open side facing the feed opening; wherein, an airflow passage is located around at least a part of the periphery of the inner oven body between the inner oven body and the casing, and has an inlet and an outlet,
a blower having a blower outlet communicating with the inlet, in which the blower is adapted to outputting an airflow from the blower outlet;
a branched member including a branched passage which has a branched inlet and a branched outlet, in which the branched inlet communicates with the blower outlet;
a gas supply pipe for supplying gas having a gas outlet;
a combustion device for burning gas disposed in the baking space at the inner oven body and communicating with the branched outlet and the gas outlet; and
a partition which connects the inner oven body to the casing and separates the inner oven body and the casing to form an accommodating space; wherein, the partition has an opening forming the inlet of the airflow passage; the blower is located in the accommodating space and the blower outlet faces the opening.

2. The gas oven in claim 1, wherein the branched member is a branched tube having a first end and a second end, the first end has the branched inlet while the second end has the branched outlet, and the first end of the branched tube faces the blower outlet.

3. The gas oven in claim 2, wherein at least a part of the branched member is located in the airflow passage and the first end is located at the opening.

4. The gas oven in claim 3, wherein the branched tube has an outlet section, one end of the outlet section forms the second end and the other end thereof has a through hole; the gas supply pipe includes a nozzle having the gas outlet, in which the nozzle passes through the through hole and the gas outlet is located inside the outlet section.

5. The gas oven in claim 3, wherein the branched inlet at the first end of the branched tube has a first opening area and the blower outlet has a second opening area, in which the second opening area is four times or more than the first opening area.

6. The gas oven in claim 1, comprising two side partitions respectively attached to one of two sides of a rear end of the inner oven body; the rear end of the inner oven body, the two side partitions, the partition, and a rear case plate of the casing together define a portion of the airflow passage.

7. The gas oven in claim 1, comprising an exhaust assembly disposed at a top part of the inner oven body and located in the airflow passage; the top part of the inner oven body has a first exhaust vent communicating with the baking space; the exhaust assembly has a second exhaust vent and an exhaust passage, in which the second exhaust vent communicates with the first exhaust vent via the exhaust passage.

8. The gas oven in claim 7, wherein the inner oven body includes a top plate having the first exhaust vent; the exhaust assembly includes an upper cover plate having the second exhaust vent and the exhaust passage is located below the upper cover plate.

9. The gas oven in claim 8, wherein the second exhaust vent includes a first side edge and a second side edge, and the first side edge is closer to a rear side of the inner oven body compared to the second side edge; the exhaust assembly includes a guide plate located in the airflow passage, in which the guide plate is attached to the first side edge of the second exhaust vent and inclined towards the second side edge from the first side edge.

10. The gas oven in claim 8, wherein the first exhaust vent has a first side edge and a second edge, and the second side edge is closer to the combustion device compared to the first side edge; the inner oven body includes a guide plate located in the baking space and attached to the first side edge of the first exhaust vent; the guide plate is inclined towards the second side edge from the first side edge.

11. The gas oven in claim 7, comprising an upper partition and a water cooling tube, wherein the upper partition is located above the exhaust assembly and a bottom surface thereof forms a part of a wall of the airflow passage; the water cooling tube is disposed at the bottom surface or a top surface of the upper partition.

12. A gas oven, comprising:
a casing having a feed opening;
an inner oven body disposed in the casing and having a baking space which has an open side facing the feed opening; wherein, an airflow passage is located around at least a part of the periphery of the inner oven body between the inner oven body and the casing, and has an inlet and an outlet,
a blower having a blower outlet communicating with the inlet, in which the blower is adapted to outputting an airflow from the blower outlet;
a branched member including a branched passage which has a branched inlet and a branched outlet, in which the branched inlet communicates with the blower outlet;
a gas supply pipe for supplying gas having a gas outlet; and
a combustion device for burning gas disposed in the baking space at the inner oven body and communicating with the branched outlet and the gas outlet;
wherein the casing includes a front panel having the feed opening; the inner oven body has a front plate; a part of the airflow passage is located between the front plate and the front panel; the outlet of the airflow passage is located between the front panel and the front plate above the feed opening.

13. The gas oven in claim 12, comprising a door pivotally mounted at the casing, wherein an interior of the door includes an air passage having an air inlet and an air outlet, the air inlet is located at a top part of the door and the air outlet communicates with an outside; the door is pivotable between a first position and a second position; at the first position, the door closes the feed opening and establishes communication between the air inlet and the outlet of the airflow passage; at the second position, the door opens the feed opening and the air inlet is away from the outlet of the airflow passage.

14. The gas oven in claim 13, wherein the air outlet is located at an outer panel of the door.

15. The gas oven in claim 13, wherein the door includes a left side part, a right side part, and a bottom part; the air outlet is located on at least one of the left side part, the right side part, and the bottom part.

16. The gas oven in claim 13, wherein the door includes an outer panel, an inner panel, and a partition member; a sandwiched space exists between the outer panel and the inner panel; the partition member is attached between the outer panel and the inner panel and divides the sandwiched space into a first space and a second space which are isolated from each other; the first space forms the air passage; wherein, the outer panel includes an outer transparent area and the inner panel includes an inner transparent area, and the second space is located between the outer transparent area and the inner transparent area.

17. The gas oven in claim 13, wherein the casing includes a front casing body having the front panel; the front casing body has at least one connecting vent around the feed opening and has a terminal vent at at least one side; the at least one connecting vent communicates with the terminal vent via a space inside the front casing body; the air outlet of the air passage of the door is located at at least one side part of the door; when the door is at the first position, the air outlet communicates with the outside via the at least one connecting vent and the terminal vent.

\* \* \* \* \*